US012010698B2

(12) United States Patent
Zhang et al.

(10) Patent No.: US 12,010,698 B2
(45) Date of Patent: Jun. 11, 2024

(54) TECHNIQUES FOR MANAGING SEMI-STATIC SCHEDULING OCCASION OVERWRITES FOR FULL DUPLEX COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Juan Montojo, San Diego, CA (US); Navid Abedini, Basking Ridge, NJ (US); Jelena Damnjanovic, Del Mar, CA (US); Peter Gaal, San Diego, CA (US); Junyi Li, Fairless Hills, PA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/393,272

(22) Filed: Aug. 3, 2021

(65) Prior Publication Data

US 2023/0041108 A1 Feb. 9, 2023

(51) Int. Cl.
*H04W 72/20* (2023.01)
*H04W 72/23* (2023.01)

(52) U.S. Cl.
CPC ........... *H04W 72/23* (2023.01); *H04W 72/20* (2023.01)

(58) Field of Classification Search
None
See application file for complete search history.

(56) References Cited

U.S. PATENT DOCUMENTS

2018/0098349 A1 4/2018 Sun et al.
2018/0367289 A1* 12/2018 Kim ...................... H04L 5/0078
(Continued)

FOREIGN PATENT DOCUMENTS

WO 2019137116 A1 7/2019

OTHER PUBLICATIONS

Vivo, Discussion on the Periodicity Misalignment Between TSC Traffic and SPS/CG, 2019, 3GPP TSG-RAN WG2 Meeting#107, R2-1910006, pp. 1-3. (Year: 2019).*

(Continued)

*Primary Examiner* — Nicholas Sloms
(74) *Attorney, Agent, or Firm* — Patterson+ Sheridan, L.L.P.

(57) ABSTRACT

Certain aspects of the present disclosure provide techniques for communicating a dynamically scheduled transmission that overwrites a transmission in a semi-static scheduling occasion. A method performed by a user equipment (UE) includes receiving a first control message, activating a first semi-static scheduling configuration and a second semi-static scheduling configuration for full duplex communication, wherein: the first semi-static scheduling configuration comprises a semi-persistent scheduling (SPS) occasion and the second semi-static scheduling configuration comprises a configured grant (CG) occasion. The method may further include receiving a second control message dynamically scheduling a transmission that overwrites a downlink transmission in the SPS occasion or an uplink transmission in the CG occasion and taking one or more actions to communicate at least the transmission that overwrites the downlink transmission in the SPS occasion or the uplink transmission in the CG occasion.

30 Claims, 13 Drawing Sheets

(56) References Cited

U.S. PATENT DOCUMENTS

| | | | |
|---|---|---|---|
| 2020/0169377 A1* | 5/2020 | Lee | H04W 56/0015 |
| 2021/0068106 A1 | 3/2021 | Damnjanovic et al. | |
| 2021/0315023 A1* | 10/2021 | Tesanovic | H04W 72/569 |
| 2021/0376985 A1* | 12/2021 | Zhou | H04L 5/0053 |
| 2022/0295561 A1* | 9/2022 | Wang | H04W 74/0866 |
| 2023/0014238 A1* | 1/2023 | Pocovi | H04L 5/14 |

OTHER PUBLICATIONS

Sequans Communications, Configured Grant Enhancements for TSC Traffic, 2019, 3GPP TSG-RAN WG2 Meeting#106, R2-1907117, pp. 1-5. (Year: 2019).*
International Search Report and Written Opinion—PCT/US2022/072690—ISA/EPO—dated Sep. 13, 2022.

\* cited by examiner

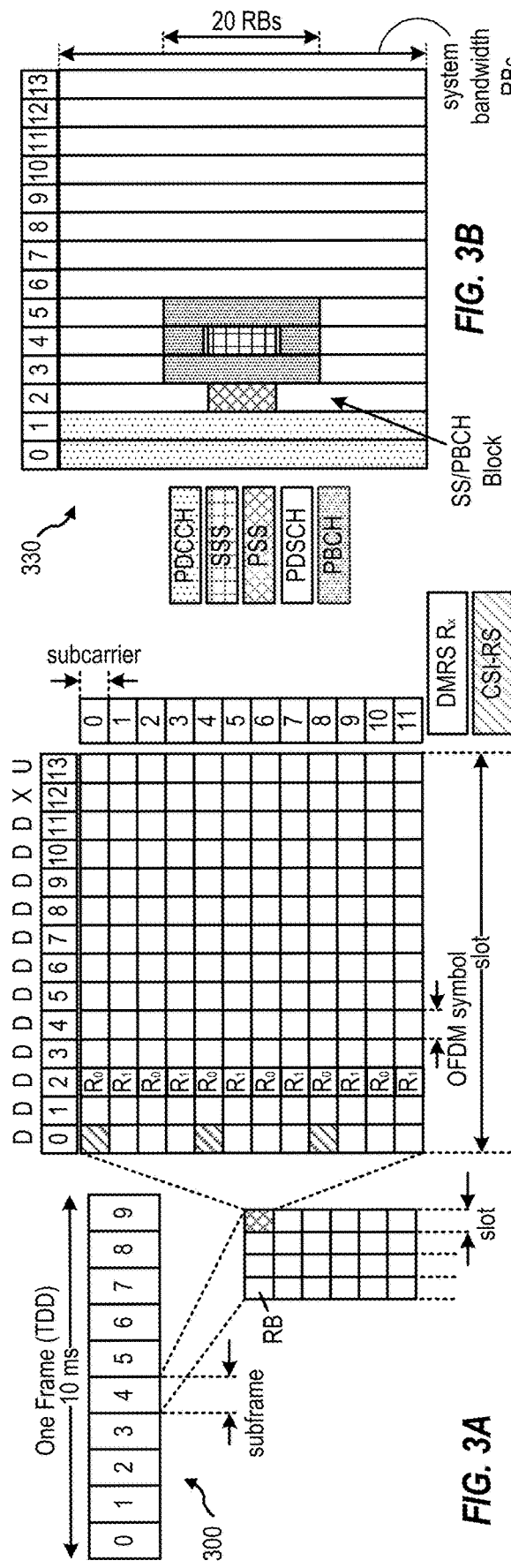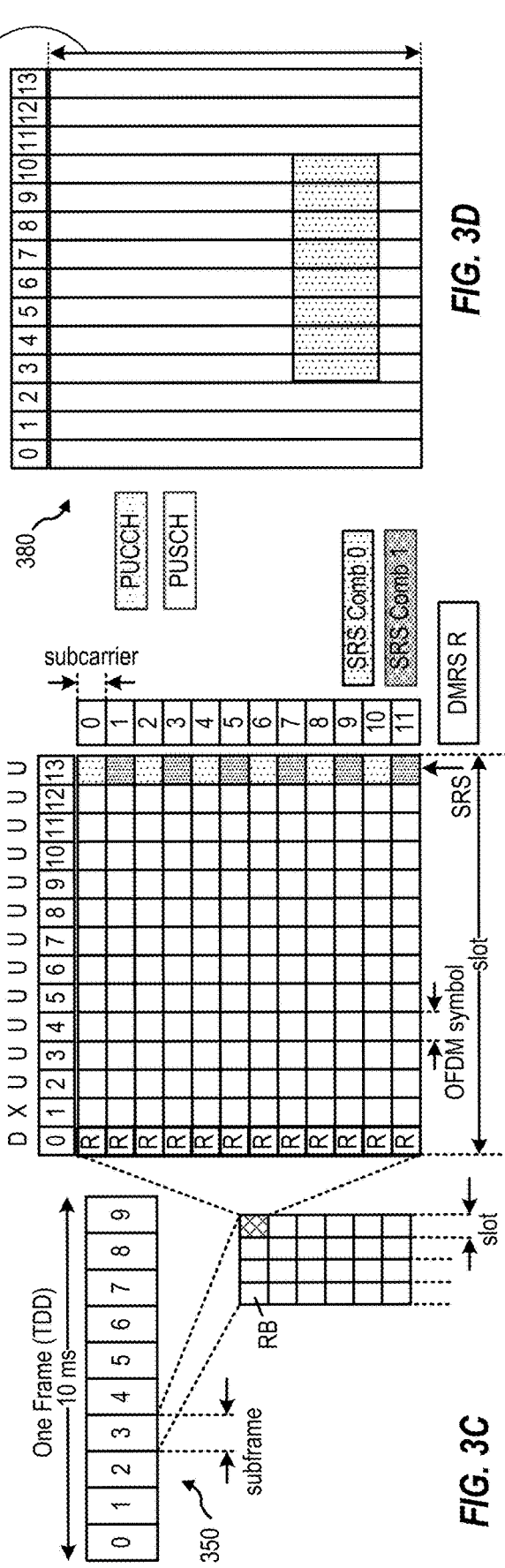

TECHNIQUES FOR MANAGING SEMI-STATIC SCHEDULING OCCASION OVERWRITES FOR FULL DUPLEX COMMUNICATION

INTRODUCTION

Aspects of the present disclosure relate to wireless communications, and more particularly, to techniques for managing scenarios during full duplex communication in which a scheduling occasion becomes overwritten by a dynamic grant (DG).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a user equipment (UE). The method generally includes receiving a first control message from a base station (BS), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion. Additionally, the method may further include receiving a second control message comprising a dynamic grant that schedules a transmission associated with the UE that overwrites at least one of the downlink transmission in the at least one SPS occasion or the uplink transmission in the at least one CG occasion and taking one or more actions, based on the dynamic grant, to communicate, with the BS, at least the transmission that overwrites the at least one of the downlink transmission in the at least one SPS occasion or the uplink transmission in the at least one CG occasion.

Certain aspects can be implemented in an apparatus for wireless communication. The apparatus includes a memory comprising executable instructions and one or more processors configured to execute the executable instructions and cause the apparatus to: receive a first control message from a base station (BS), activating a first semi-static scheduling configuration and a second semi-static scheduling configuration for full duplex communication. In some cases, the first semi-static scheduling configuration comprises at least one semi-persistent scheduling (SPS) occasion in which the apparatus is scheduled to receive a downlink transmission from the BS. Additionally, in some cases, the second semi-static scheduling configuration comprises at least one configured grant (CG) occasion in which the apparatus is scheduled to transmit an uplink transmission to the BS, wherein the at least one CG occasion at least partially overlaps in time with the at least one SPS occasion. Additionally, the one or more processors may be configured to cause the apparatus to receive a second control message comprising a dynamic grant that schedules a transmission associated with the apparatus that overwrites at least one of the downlink transmission in the at least one SPS occasion or the uplink transmission in the at least one CG occasion and take one or more actions, based on the dynamic grant, to communicate, with the BS, at least the transmission that overwrites the at least one of the downlink transmission in the at least one SPS occasion or the uplink transmission in the at least one CG occasion.

Certain aspects can be implemented in an apparatus for wireless communication. The apparatus includes means for receiving a first control message from a base station (BS), activating a first semi-static scheduling configuration and a second semi-static scheduling configuration for full duplex communication. In some cases, the first semi-static scheduling configuration comprises at least one semi-persistent scheduling (SPS) occasion in which the apparatus is scheduled to receive a downlink transmission from the BS. Additionally, in some cases, the second semi-static scheduling configuration comprises at least one configured grant (CG) occasion in which the apparatus is scheduled to transmit an uplink transmission to the BS, wherein the at least one CG occasion at least partially overlaps in time with the at least one SPS occasion. Additionally, the apparatus may further include means for receiving a second control message comprising a dynamic grant that schedules a transmission associated with the apparatus that overwrites at least one of the downlink transmission in the at least one SPS occasion or the uplink transmission in the at least one CG occasion and means for taking one or more actions, based on the dynamic grant, to communicate, with the BS, at least the transmission that overwrites the at least one of the downlink transmission in the at least one SPS occasion or the uplink transmission in the at least one CG occasion.

Certain aspects can be implemented in a non-transitory computer-readable medium for wireless communication. The non-transitory computer-readable medium comprises executable instructions that, when executed by one or more processors of an apparatus, cause the apparatus to: receive a first control message from a base station (BS), activating a first semi-static scheduling configuration and a second semi-static scheduling configuration for full duplex communication. In some cases, the first semi-static scheduling configuration comprises at least one semi-persistent scheduling (SPS) occasion in which the apparatus is scheduled to receive a downlink transmission from the BS. Additionally, in some cases, the second semi-static scheduling configuration comprises at least one configured grant (CG) occasion in which the apparatus is scheduled to transmit an uplink transmission to the BS, wherein the at least one CG occasion at least partially overlaps in time with the at least one SPS occasion. Additionally, non-transitory computer-readable medium may include executable instructions that, when executed by the one or more processors of the apparatus, cause the apparatus to receive a second control message comprising a dynamic grant that schedules a transmission associated with the apparatus that overwrites at least one of the downlink transmission in the at least one SPS occasion or the uplink transmission in the at least one CG occasion and to take one or more actions, based on the dynamic grant, to communicate, with the BS, at least the transmission that overwrites the at least one of the downlink transmission in the at least one SPS occasion or the uplink transmission in the at least one CG occasion.

Certain aspects can be implemented in a computer program product for wireless communication by a user equipment (UE). The computer program product may be embodied on a computer-readable storage medium and may comprise code for: receiving a first control message from a base station (BS), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion. Additionally, the computer program product may further comprise code for receiving a second control message comprising a dynamic grant that schedules a transmission associated with the UE that overwrites at least one of the downlink transmission in the at least one SPS occasion or the uplink transmission in the at least one CG occasion and code for taking one or more actions, based on the dynamic grant, to communicate, with the BS, at least the transmission that overwrites the at least one of the downlink transmission in the at least one SPS occasion or the uplink transmission in the at least one CG occasion.

Certain aspects can be implemented in a method for wireless communication performed by a base station (BS). The method generally includes transmitting a first control message to a user equipment (UE), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion. Additionally, the method may further include transmitting a second control message comprising a dynamic grant that schedules a transmission associated with the UE that overwrites at least one of the downlink transmission in the at least one SPS occasion or the uplink transmission in the at least one CG occasion and communicating, based on the dynamic grant, at least the transmission that overwrites the at least one of the downlink transmission in the at least one SPS occasion or the uplink transmission in the at least one CG occasion with the UE.

Certain aspects can be implemented in an apparatus for wireless communication. The apparatus includes a memory comprising executable instructions and one or more processors configured to execute the executable instructions and cause the apparatus to: transmit a first control message to a user equipment (UE), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the apparatus. Additionally, in some cases, the second semi-static scheduling configuration comprises at least one configured grant (CG) occasion in which the UE is scheduled to transmit an uplink transmission to the apparatus, wherein the at least one CG occasion at least partially overlaps in time with the at least one SPS occasion. Additionally, the one or more processor may be configured to cause the apparatus to transmit a second control message comprising a dynamic grant that schedules a transmission associated with the UE that overwrites at least one of the downlink transmission in the at least one SPS occasion or the uplink transmission in the at least one CG occasion and communicate, based on the dynamic grant, at least the transmission that overwrites the at least one of the downlink transmission in the at least one SPS occasion or the uplink transmission in the at least one CG occasion with the UE.

Certain aspects can be implemented in an apparatus for wireless communication. The apparatus includes means for transmitting a first control message to a user equipment (UE), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion. Additionally, the apparatus may further include means for transmitting a second control message comprising a dynamic grant that schedules a transmission associated with the UE that overwrites at least one of the downlink transmission in the at least one SPS occasion or the uplink transmission in the at least one CG occasion and means for communicating, based on the dynamic grant, at least the transmission that overwrites the at least one of the downlink transmission in the at least one SPS occasion or the uplink transmission in the at least one CG occasion with the UE.

Certain aspects can be implemented in a non-transitory computer-readable medium for wireless communication. The non-transitory computer-readable medium comprises executable instructions that, when executed by one or more processors of an apparatus, cause the apparatus to: transmit a first control message to a user equipment (UE), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion. Additionally, the non-transitory computer-readable medium comprises executable instructions that, when executed by the one or more processors of the apparatus, cause the apparatus to transmit a second control message comprising a dynamic grant that schedules a transmission associated with the UE that overwrites at least one of the downlink transmission in the at least one SPS occasion or the uplink transmission in the at least one CG occasion and to communicate, based on the dynamic grant, at least the transmission that overwrites the at least one of the downlink transmission in the at least one SPS occasion or the uplink transmission in the at least one CG occasion with the UE.

Certain aspects can be implemented in a computer program product for wireless communication by a base station (BS). The computer program product may be embodied on a computer-readable storage medium and may comprise code for: transmitting a first control message to a user equipment (UE), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion. Additionally, the computer program product may comprise code for transmitting a second control message comprising a dynamic grant that schedules a transmission associated with the UE that overwrites at least one of the downlink transmission in the at least one SPS occasion or the uplink transmission in the at least one CG occasion and code for communicating, based on the dynamic grant, at least the transmission that overwrites the at least one of the downlink transmission in the at least one SPS occasion or the uplink transmission in the at least one CG occasion with the UE The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Figure 1:
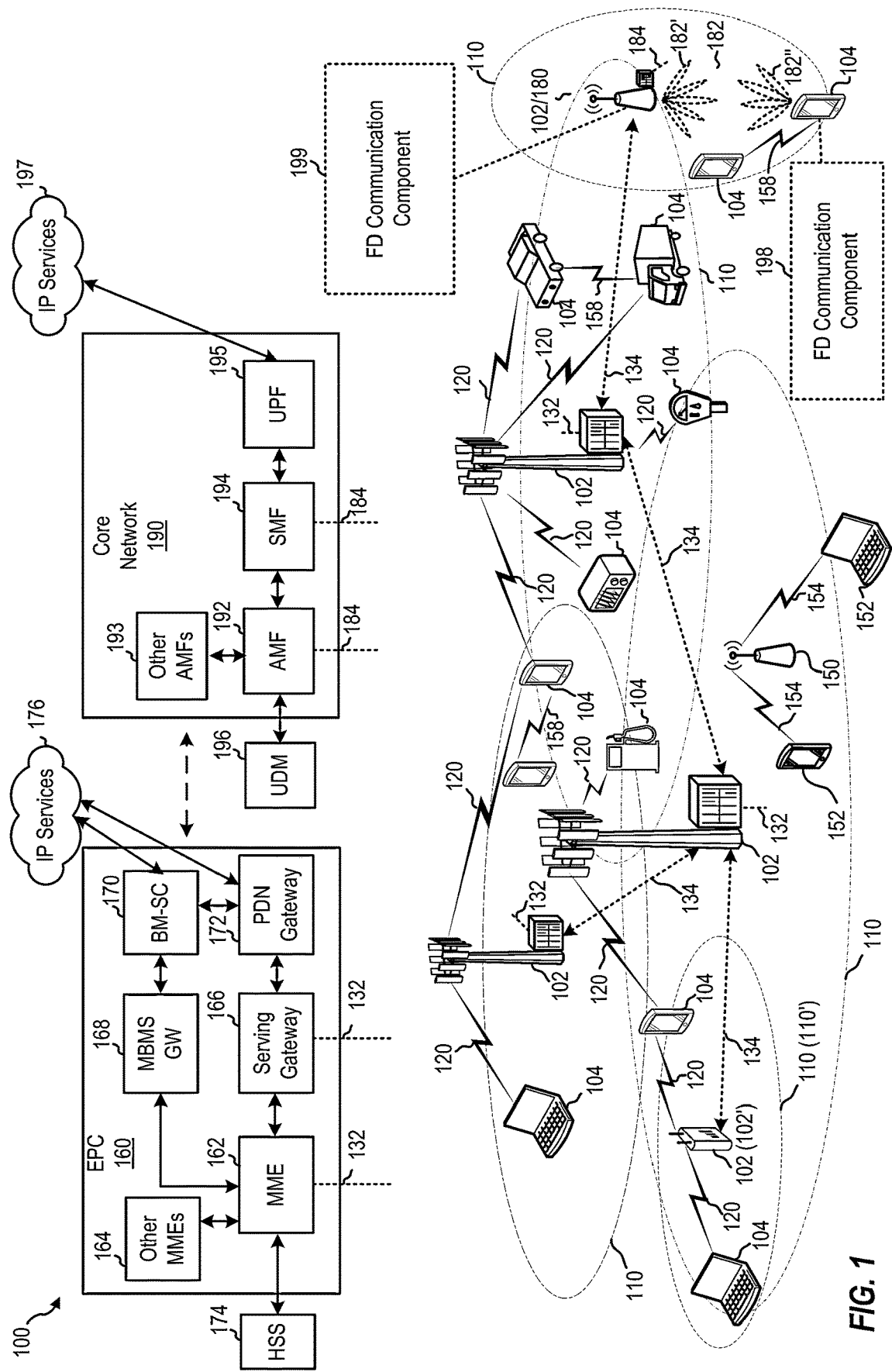
FIG. 1 is a block diagram conceptually illustrating an example wireless communication network.

Aspects of the present disclosure provide apparatuses, methods, processing systems, and computer-readable mediums for communicating dynamically scheduled transmissions that overwrite transmissions in existing semi-statically configured scheduling occasions.

In some cases, certain wireless communications devices in a wireless communication network, such as a user equipment (UE), may be capable of full duplex communication with a base station (BS) using different antenna panels. For example, in some cases, the UE may use a first antenna panel to receive downlink transmissions from the BS while simultaneously using a second antenna panel to transmit uplink transmissions to the BS or another BS. In some cases, the UE may be configured to perform the full duplex communication in one or more semi-statically configured scheduling occasions. The one or more semi-statically configured scheduling occasions may include at least one semi-persistent scheduling (SPS) occasion in which the UE is scheduled to receive a downlink transmission from the BS. The one or more semi-statically configured scheduling occasions may also include at least one configured grant (CG) occasion in which the UE is scheduled to transmit an uplink transmission to the BS, wherein the at least one CG occasion at least partially overlaps in time with the at least one SPS occasion.

In some cases, the at least one SPS occasion and the at least one CG occasion may overlap in time and, thus, the UE may be configured to use full duplex communication to receive the downlink transmission in the at least one SPS occasion while simultaneously transmitting the uplink transmission in the at least one CG occasion. Further, to facilitate the full duplex communication, the UE may be configured with a downlink receive beam for receiving the downlink transmission in the at least one SPS grant that is compatible with an uplink transmit beam configured for transmitting the uplink transmission in the at least one CG grant. Compatibility between uplink transmit beams and downlink receive beams may be defined in terms of self-interference experienced by the UE. More specifically, for example, uplink transmit beams and downlink receive beams that are compatible with each other may be associated with a level of self-interference experienced by the UE below a self-interference threshold. In other words, an uplink transmit beam that is compatible with a downlink receive beam is a beam that, when used for transmitting an uplink transmission simultaneously with receiving a downlink transmission, causes an amount of self-interference to the downlink receive beam that is less than the self-interference threshold. In contrast, when the amount of self-interference caused to the downlink receive beam by the uplink transmit beam is greater than or equal to the self-interference threshold, these beams may be considered incompatible.

While the UE may generally be configured with compatible downlink receive beams and uplink transmit beams for receiving downlink transmissions in the at least one SPS occasion and transmitting uplink transmissions in the at least one CG occasion, respectively, there may be instances in which the UE is dynamically scheduled by the BS to communicate a transmission that overwrites the at least one SPS occasion or the at least one CG occasion. For example, in some cases, the UE may be dynamically scheduled to receive a physical downlink shared channel (PDSCH) transmission that overwrites the at least one SPS occasion and that overlaps with the at least one CG occasion. Similarly, there may be cases where the UE is dynamically scheduled to transmit a physical uplink shared channel (PUSCH) transmission that overwrites the at least one CG occasion and that overlaps with the at least one SPS occasion.

Problems may arise from these scenarios when the UE is configured to communicate the dynamically scheduled transmission using a beam that is incompatible with the overlapped scheduling occasion. For example, there may be cases in which the UE is configured to receive the dynamically scheduled PDSCH transmission using a downlink receive beam that is incompatible with the uplink transmit beam used for transmitting the uplink transmission in the at least one CG occasion that overlaps in time with the PDSCH transmission. Likewise, there may be cases in which the UE is configured to transmit the dynamically scheduled PUSCH transmission using an uplink transmit beam that is incompatible with the downlink receive beam used for receiving the downlink transmission in the at least one SPS occasion that overlaps in time with the PUSCH transmission.

These scenarios of dynamically scheduled transmissions being configured with incompatible beams may cause certain negative effects, such as increased transmission/reception latency, leading to poor user experience. Additionally, these negative effects may include transmissions that cannot be properly received or decoded, which may lead to wasted time and frequency resources within the wireless communication network, as well as wasted power resources at a transiting device and receiving device, associated with having to retransmit/re-receive the transmissions that were not previously properly received/decoded due to the self-interference between antenna panels.

Accordingly, aspects of the present disclosure provide techniques to help reduce self-interference experienced by wireless communications devices that are capable of FD communication. For example, in some cases, such techniques may include a UE reporting, to a BS, antenna panel information indicating one or more pairs of antenna panels that are capable of FD communication. In some cases, the one or more pairs of antenna panels that are capable of the FD communication may include pairs of antenna panels that do not (or minimally) interfere with each other. The UE may then be configured with at least one of these pairs of antenna panels, thereby reducing self-interference when performing the FD communication and helping to alleviate the negative effects described above.

Thus, as noted above, aspects of the present disclosure provide techniques for managing scenarios during full duplex communication in which a scheduling occasion becomes overwritten by a dynamic grant. For example, to help reduce the negative effects described above, the techniques presented may be used by a UE to determine whether or not to proceed with communicating a transmission in a first scheduling occasion using a beam that conflicts with a beam used for communicating a dynamically scheduled transmission in an overwritten scheduling occasion that overlaps with the first scheduling occasion.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Figure 9:
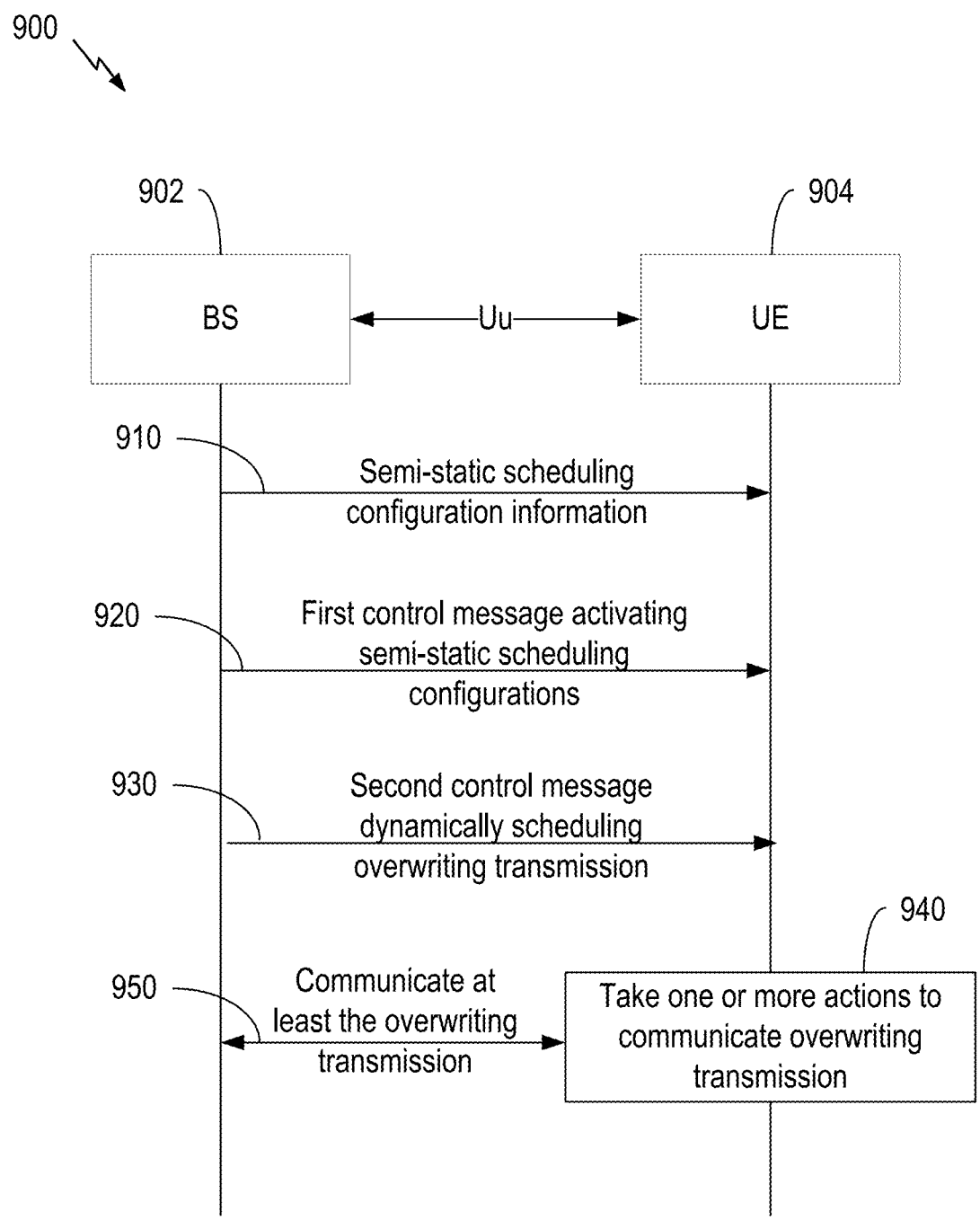
FIG. 9 is a call flow diagram illustrating example operations between a base station and a user equipment for communicating dynamically scheduled transmissions that overwrite transmissions in existing semi-statically configured scheduling occasions.
Figure 10:
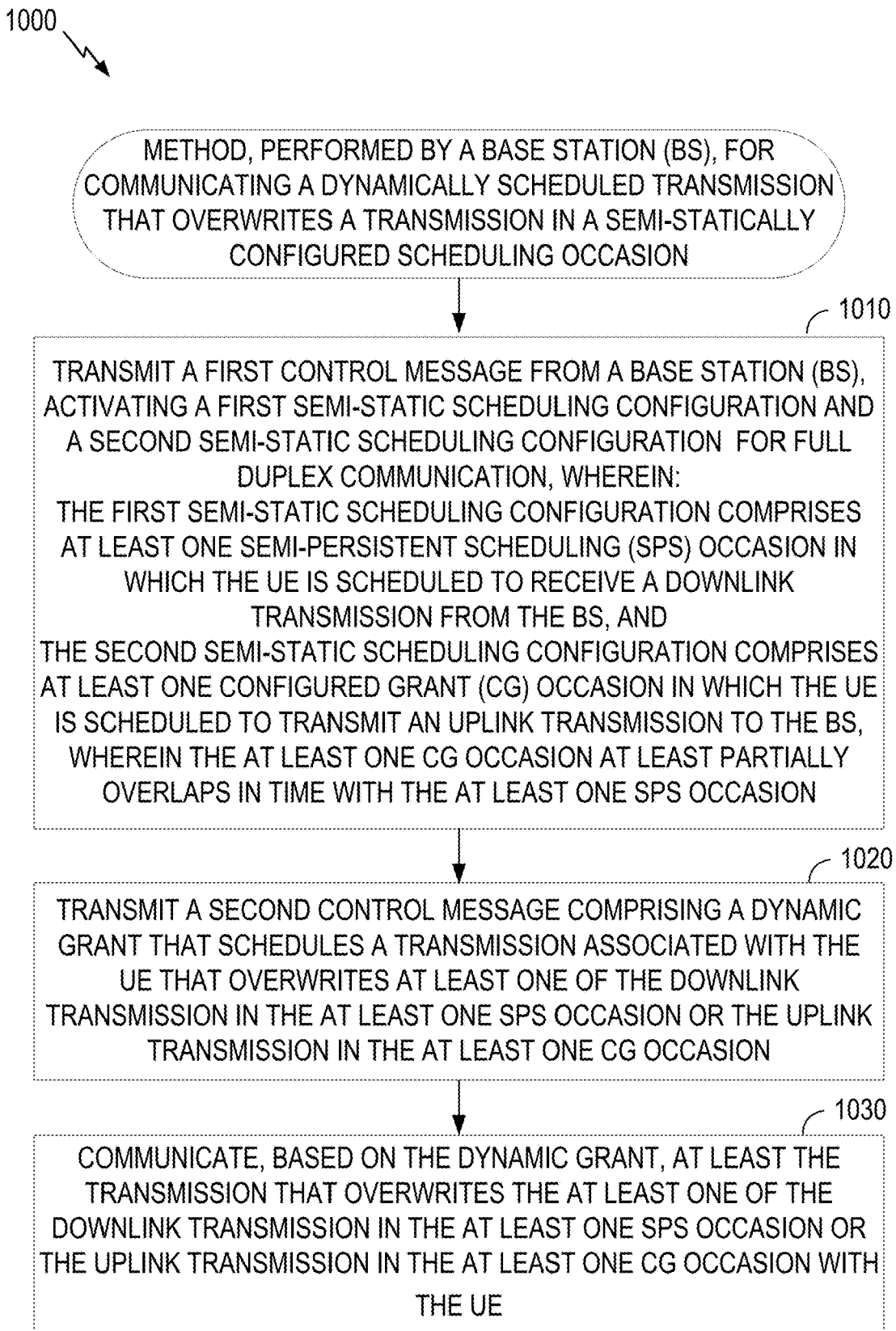
FIG. 10 is a flow diagram illustrating example operations for wireless communication by a base station.

Wireless communication network 100 includes full-duplex (FD) communication component 199, which may be configured to perform the operations illustrated in one or more of FIGS. 9-10, as well as other operations described herein for communicating dynamically scheduled transmissions that overwrite transmissions in existing semi-statically configured scheduling occasions. Wireless communication network 100 further includes FD communication component 198, which may be configured to perform the operations illustrated in one or more of FIG. 9 or 11, as well as other operations described herein for communicating dynamically scheduled transmissions that overwrite transmissions in existing semi-statically configured scheduling occasions.

Figure 2:
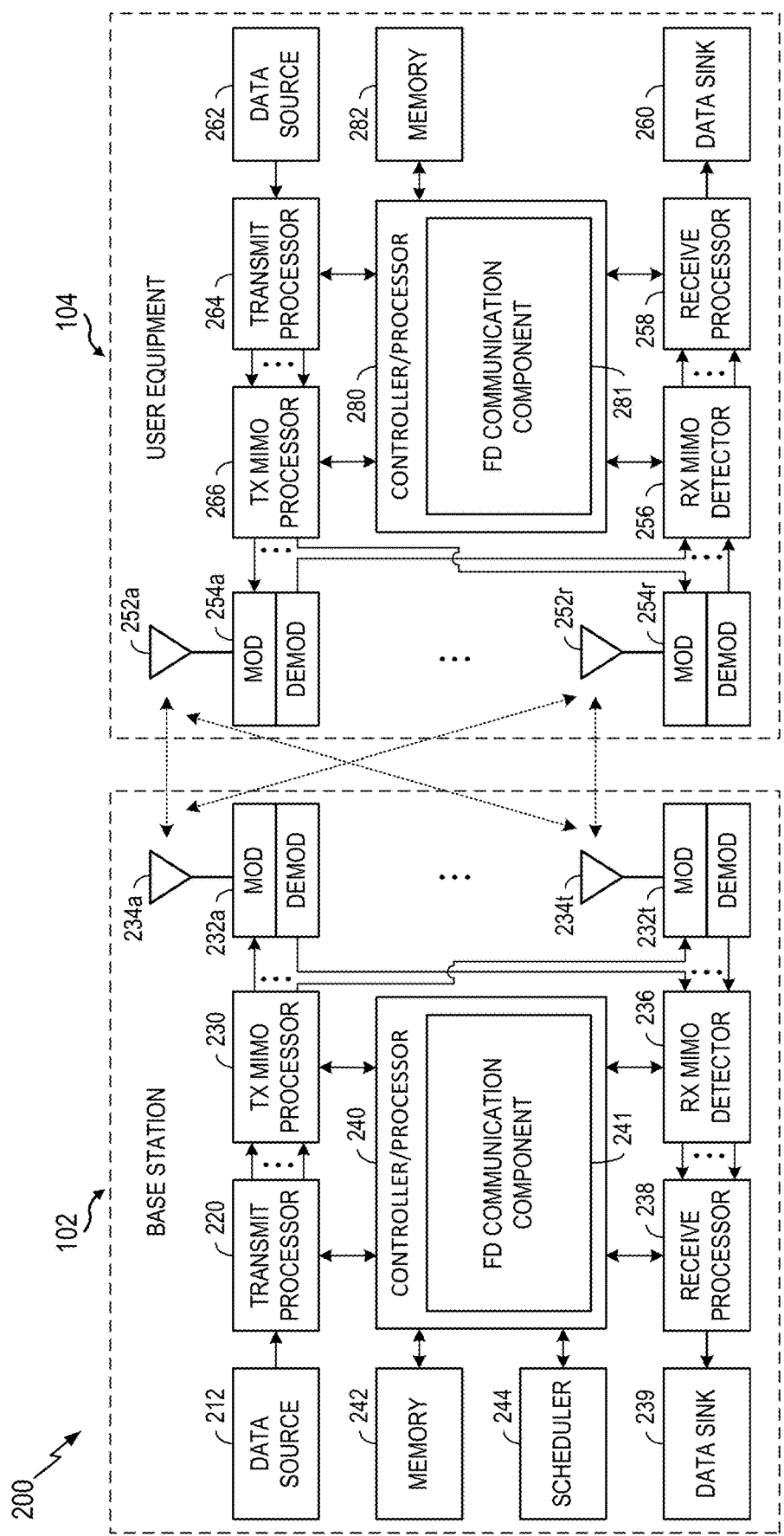
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes FD communication component 241, which may be representative of FD communication component 199 of FIG. 1. Notably, while depicted as an aspect of controller/processor 240, FD communication component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes FD communication component 281, which may be representative of FD communication component 198 of FIG. 1. Notably, while depicted as an aspect of controller/processor 280 FD communication component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Introduction to Multi Antenna Panel Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

Introduction to Full Duplex and Half Duplex Communication

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 4A:
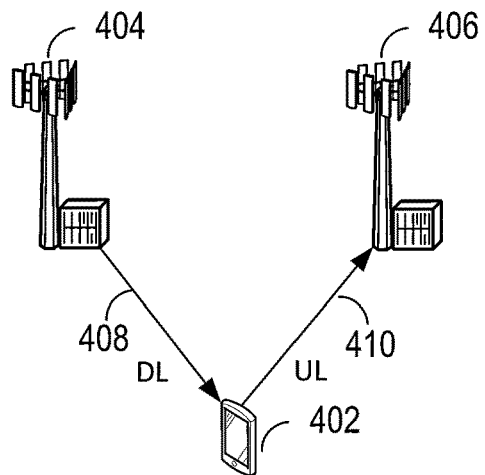
FIGS. 4A-4C illustrates different full-duplex use cases within a wireless communication network.
Figure 4B:
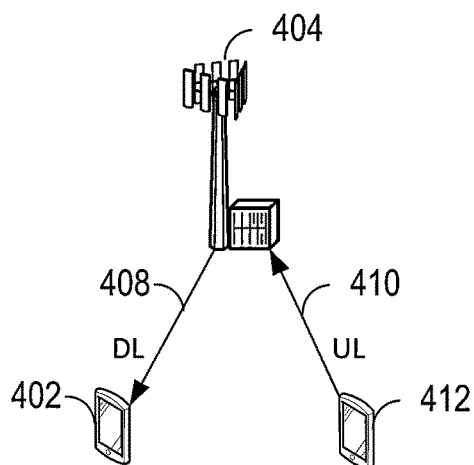
Figure 4C:
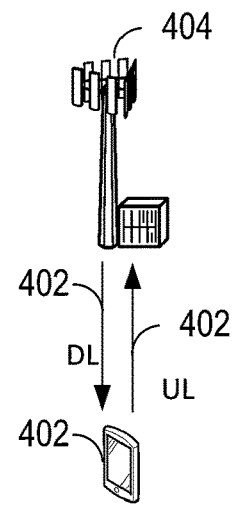

FIGS. 4A-4C illustrates different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 may simultaneously receive DL transmissions 408 from the BS 404 and transmit UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 may receive DL transmissions 408 from the BS 404 while another UE 412 may simultaneously transmit UL transmission 410 to the BS 404. Thus, in this example, BS 404 is conducting simultaneous uplink and downlink communications.

A third FD use case is illustrated in FIG. 4C involving one BS and one UE. As illustrated, the UE 402 may receive DL transmissions 408 from the BS 404 and may simultaneously transmit UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 4A) for mTRP |
| FD enabled | FD disabled | Use case #2 (FIG. 4B) + R-16 IAB |
| FD enabled | FD enabled | Use case #3 (FIG. 4C) |

As shown, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 4A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Figure 5:
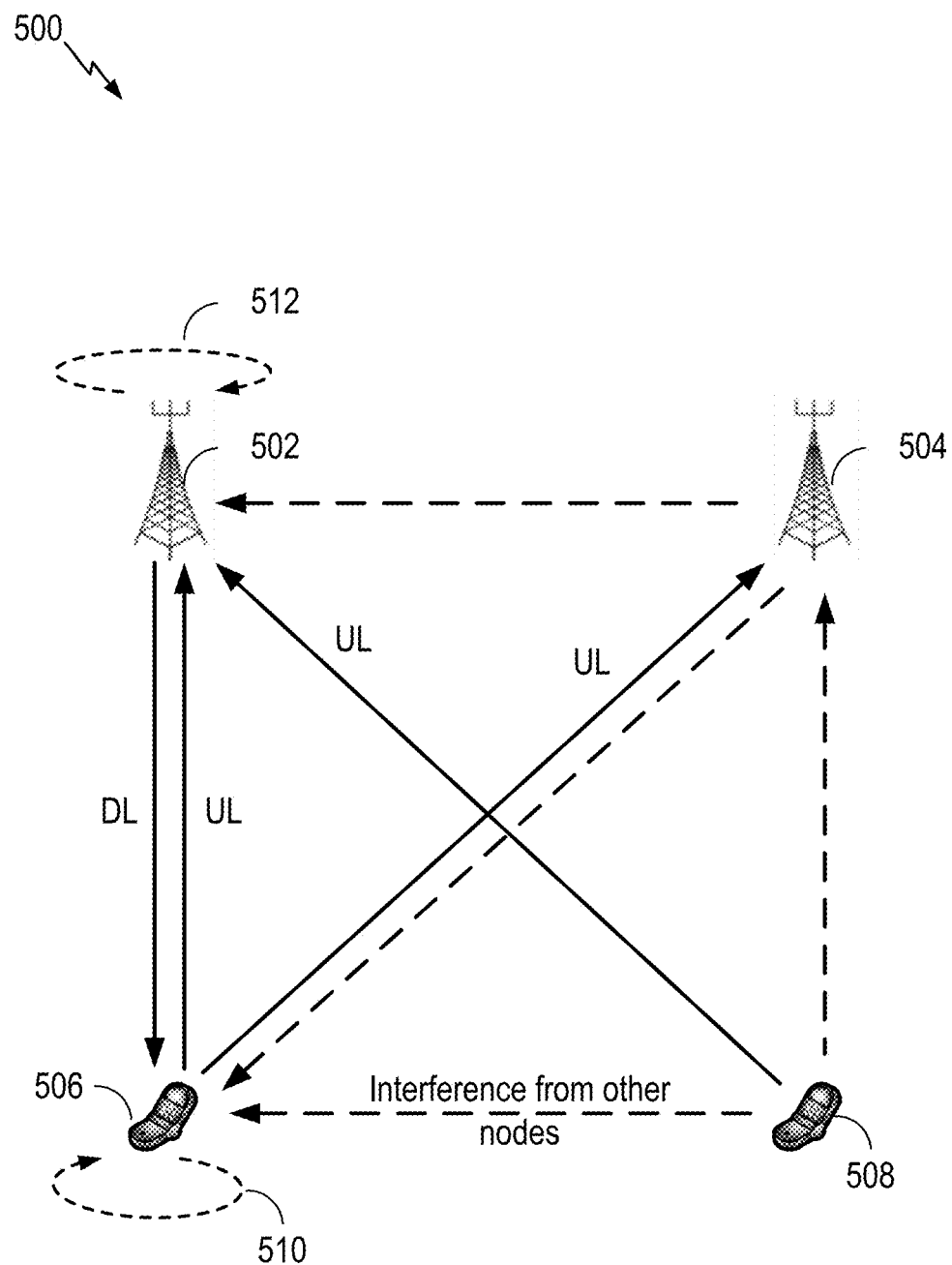
FIG. 5 illustrates interference scenarios that may occur within a wireless communications network.

As noted above, FD communication provides for reduced transmission and reception latency and increased spectrum efficiency; however, wireless communications devices that use FD communication may still be susceptible to certain interferences, such as self-interferences caused between antenna panels used for uplink and downlink transmissions. Similarly, wireless communications devices that are capable of using FD communication may also be susceptible to interference from neighboring wireless communications devices. FIG. 5 illustrates interference scenarios that may occur within a wireless communications network 500 in which FD and HD communications may be used. In some cases, the wireless communications network 400 may be an example of the wireless communications network 100 of FIG. 1.

As shown in FIG. 5, wireless communication may occur between a plurality of wireless communication devices, such as BS 502, BS 504, UE 506, and UE 508. In some cases, BS 502 and UE 506 may be capable of FD communication while BS 504 and UE 508 may only be capable of HD communication. As such, HD and FD communication may be intermixed in the wireless communication network 400. Such intermixed HD and FD communication may include communication between an FD UE and an HD BS (e.g., UE 506 and BS 504), between an FD BS and an HD UE (e.g., BS 502 and UE 508), and between an FD BS and an FD UE (e.g., BS 502 and UE 506).

In some cases, as noted above, wireless communications devices that are capable of using FD communication, such as BS 502 and UE 506, may be susceptible to interference from neighboring wireless communications devices. In the example illustrated in FIG. 5, FD-capable UE 506 may be susceptible to interference from neighboring UE 508 as well as neighboring BS 504. Similarly, in the example illustrated in FIG. 5, FD-capable BS 502 may be susceptible to interference from neighboring BS 504.

Moreover, FD-capable BS 502 and FD-capable UE 506 may also be susceptible to self-interference between antenna panels used for FD communication. For example, as illustrated, UE 506 may experience self-interference 510 between antenna panels used for FD communication with the BS 502 and/or BS 504. More specifically, for example, the UE 506 may experience self-interference 510 between an antenna panel used for receiving downlink transmissions from the BS 502 and an antenna panel used for transmitting uplink transmissions to the BS 502 and/or BS 504. Similarly, the BS 502 may experience self-interference 512 between an antenna panel used for receiving uplink transmissions from the UE 506 and an antenna panel used for transmitting downlink transmissions the UE 506.

This self-interference that may be experienced by wireless communications devices that are capable of FD communication is undesirable and can lead to negative effects. These negative effects may include transmissions that cannot be properly received or decoded, which may lead to wasted time and frequency resources within the wireless communication network 500, as well as wasted power resources at a transiting device and receiving device, associated with having to retransmit/re-receive the transmissions that were not previously properly received/decoded due to the self-interference between antenna panels.

Aspects Related to Managing Semi-Static Scheduling Occasion Overwrites for Full Duplex Communication Wireless communications devices, such as UEs capable of FD communication with a base station, may be scheduled to communicate (e.g., transmit and/or receive) transmissions in different manners. For example, a first manner of scheduling UEs involves using a dynamic grant. For example, to schedule a UE using a dynamic grant, the base station may transmit control information, such as downlink control information (DCI), which includes the dynamic grant. The dynamic grant may include an indication of one or more time and frequency resources for receiving a downlink transmission or transmitting an uplink transmission. In some cases, the one or more time and frequency resources may be non-periodic and may be allocated to the UE for a particular uplink/downlink transmission. As such, another transmission needs to be scheduled for the UE, the base station may transmit another dynamic grant with additional scheduling information for this other transmission, which may increase overhead signaling.

In other cases, a semi-persistent scheduling (SPS) configuration may be used to schedule a UE with a periodic set of time and frequency resources, known as SPS occasions, for periodically receiving downlink transmissions, such as transmissions on physical downlink shared channel (PDSCH). Configuring a UE with an SPS configuration that schedules a UE with a periodic set of time and frequency resources for receiving PDSCH transmissions may minimize control overhead since control signaling only needs to be transmitted once to activate the SPS configuration and schedule the UE to receive the PDSCH transmissions in the periodic set of time and frequency resources.

SPS was also used in long term evolution (LTE) for scheduling uplink transmissions for UEs, such as transmission of a physical uplink shared channel (PUSCH). However, the periodic set of time and frequency resources for SPS was usually dedicated to a single UE. As a result, if this single UE does not need certain resources in the periodic set of time and frequency resources for uplink transmissions, the resources that are unemployed by the UE were wasted. Accordingly, to reduce the waste of periodically allocated resources, Fifth Generation (5G) New Radio (NR) enables multiple UEs to share a periodic set of time and frequency resources, known a configured grant (CG) occasions or CG resources. For example, a base station transmit a CG configuration that allocates the CG occasions/resources to multiple UEs, and the UEs may randomly utilize the resources when they have data to transmit. By assigning the CG resources, the base station may eliminate packet transmission delay for a scheduling request procedure associated with scheduling uplink transmissions and increases a utilization ratio of allocated periodic time and frequency resources.

Figure 6:
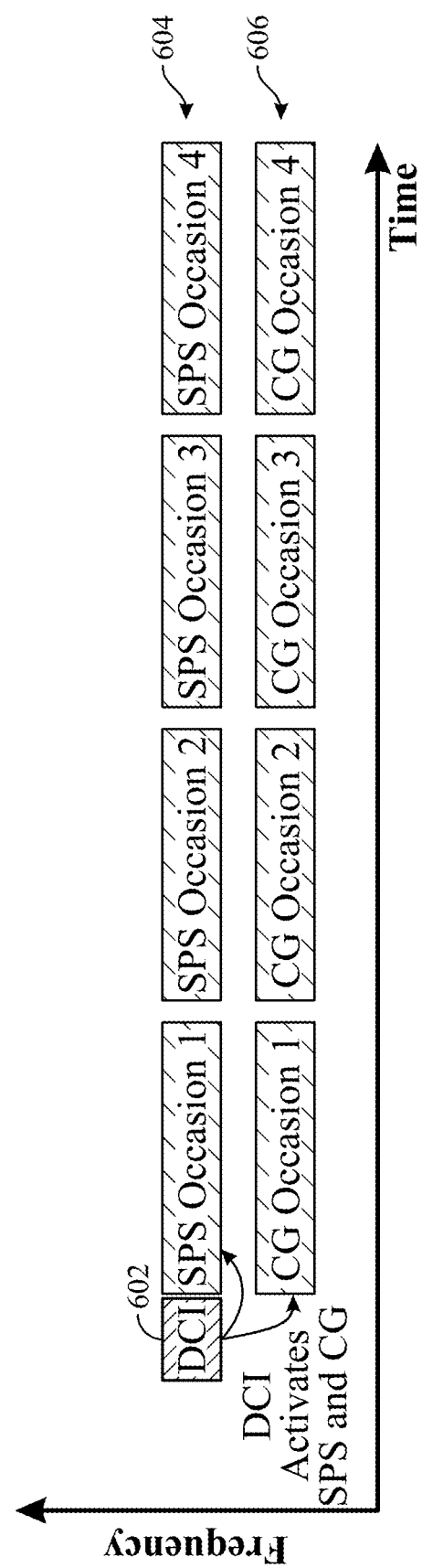
FIG. 6 illustrates overlapping semi-static scheduling occasions.

In some cases, when communicating using full duplex, SPS occasions and CG occasions may be permitted to overlap in time. For example, as illustrated in FIG. 6, a downlink control information (DCI) message 602 may be received by a UE from a base station. The DCI message 602 may include information activating an SPS configuration including a first set of SPS occasions 604 and activating a CG configuration including a second set of CG occasions 606. As noted above, the SPS occasions may be used for receiving downlink transmissions from the base station, such as PDSCH transmissions. Similarly, the CG occasions 608 may be used for transmitting uplink transmission to the base station, such as PUSCH transmissions. When the UE is capable of FD communication, SPS occasions in the set of SPS occasions 604 may overlaps with CG occasions in the set of CG occasions 606. For example, as pictured in FIG. 6, each SPS occasion of the set of SPS occasions 604 completely overlaps with a corresponding CG occasion in the set of CG occasions 606. As such, downlink transmissions within the set of SPS occasions 604 may be received simultaneously in time with uplink transmissions by the UE within the set of CG occasions 606, for example, using FD communication.

While FIG. 6 illustrates all SPS occasions of the set of SPS occasions 604 overlapping with the CG occasions of the set of CG occasions 606, there may be cases in which only a subset of the SPS occasions of the set of SPS occasions 604 overlap with a subset of CG occasions of the set of CG occasions 606. In this case, downlink transmissions in the subset of SPS occasions that overlap with uplink transmissions in the subset of CG occasions may be communicated simultaneously in time using full duplex communication. Remaining SPS occasions not within the subset of SPS occasions and remaining CG occasions not within the subset of CG occasions may not be overlapped and may be communicated at different times using half duplex communication.

In some cases, when performing full duplex communication to simultaneously receive downlink transmissions in SPS occasions and transmitting uplink transmissions in CG occasions, the UE may use a pair of compatible beams to receive the downlink transmissions and to transmit the uplink transmissions. In some cases, the pair of compatible beams may include a downlink receive beam associated with a first antenna panel of the UE to receive the downlink transmissions and an uplink transmit beam associated with a second antenna panel of the UE to transmit the uplink transmissions. In some cases, compatibly of beams in a pair of beams may be defined in terms of self-interference at the UE. For example, a pair of beams that are compatible with each other may be defined as a first pair of beams whose use (e.g., to transmit and receive transmissions) produces an amount of self-interference (e.g., measured by the UE) is below a self-interference threshold whereas a pair of beams that are not compatible with each other may be defined as a second pair of beams whose use produces an amount of self-interference that is greater than or equal to the self-interference threshold.

Figure 7:
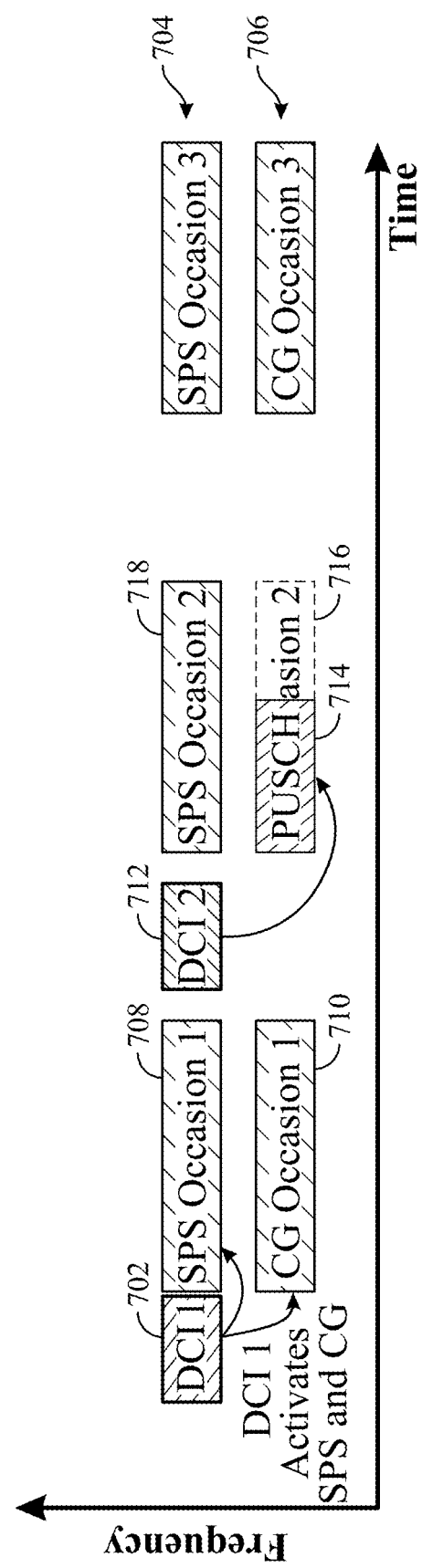
FIG. 7 illustrates a scenario in which a user equipment is dynamically scheduled with an uplink transmission that overwrites an existing configured grant occasion.
Figure 8:
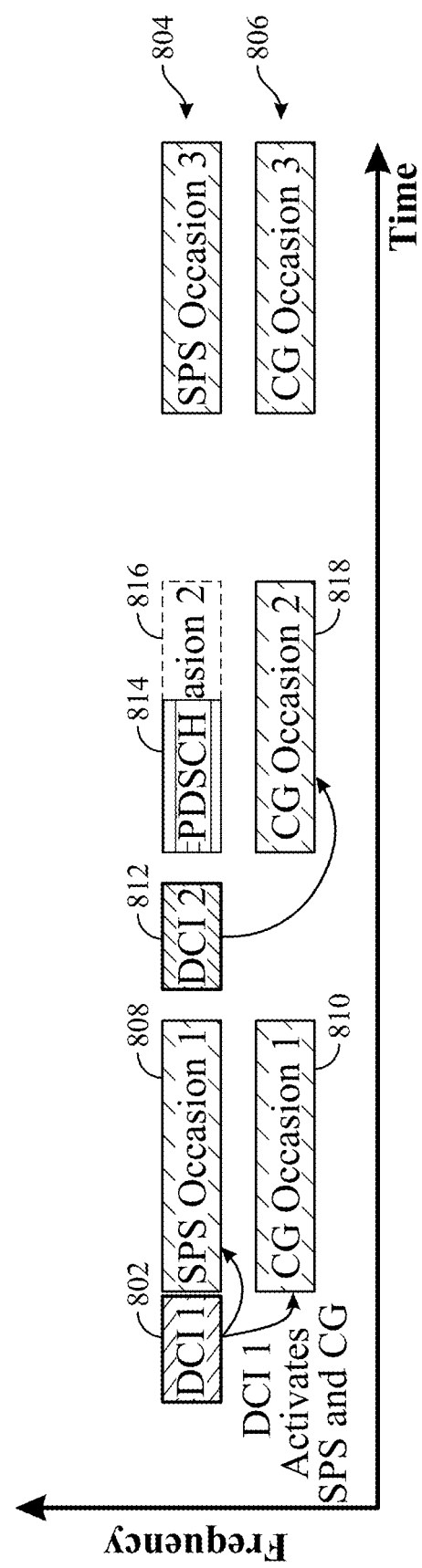
FIG. 8 illustrates a scenario in which a user equipment is dynamically scheduled with a downlink transmission that overwrites an existing configured semi-persistent scheduling occasion.

In either case, the UE may be configured with a downlink receive beam receiving downlink transmissions in SPS occasions that is compatible with an uplink transmit beam used for transmitting uplink transmissions in CG occasions, for example, so as to minimize self-interference at the UE. However, there may be cases where the UE receives another DCI message that includes a dynamic grant, dynamically scheduling the UE to communicate (e.g., transmit or receive) a transmission, that overwrites an existing SPS occasion or CG occasion, using an incompatible beam. FIGS. 7-8 illustrate different scenarios in which a UE may be scheduled to transmit a transmission that overwrites an existing SPS occasion or CG occasion. This type of transmission may be referred to as an "overwriting transmission."

FIG. 7 illustrates a scenario in which a UE is dynamically scheduled with an uplink transmission (e.g., PUSCH transmission) that overwrites an existing CG occasion. For example, as illustrated, the UE may receive a first DCI message 702. The first DCI message may include information activating an SPS configuration including a set of SPS occasions 704 and activating a CG configuration including a set of CG occasions 706. As shown, SPS occasions in the set of SPS occasions 704 and CG occasions in the set of CG occasions 706 may overlap in time. Thus, the UE may communicate transmissions in the SPS occasions in the set of SPS occasions 704 and CG occasions in the set of CG occasions 706 simultaneously, using full duplex communication.

In some cases, the first DCI message 702 may also configure the UE with a downlink receive beam for receiving downlink transmissions in the SPS occasions of the set of SPS occasions 704. Likewise, the first DCI message may also configure the UE with an uplink transmit beam for transmitting uplink transmissions in the CG occasions of the set of CG occasions 706. Accordingly, for example, the UE may receive a first downlink transmission from a base station using the first downlink receive beam in SPS occasion 708 while simultaneously transmitting a first uplink transmission using the first uplink transmit beam in CG occasion 710.

Thereafter, the UE may receive a second DCI message 712. In some cases, the second DCI message 712 may include a dynamic grant that dynamically schedules the UE to transmit an uplink transmission 714, such as a PUSCH transmission, that at least partially overwrites existing uplink transmissions in a second CG occasion 716. In other words, the dynamic grant may cause the UE to drop the existing uplink transmissions in the second CG occasion 716 and instead dynamically transmit the uplink transmission 714. While FIG. 7 only illustrates a single uplink transmission 714 that overwrites an existing CG occasion (e.g., the second CG occasion 716), it should be understood that the second DCI message 712 may schedule the UE to transmit additional overwriting transmissions in additional CG occasions.

In some cases, the second DCI message 712 may also configure the UE with a second uplink transmit beam for transmitting the uplink transmission 714 during the overwritten second CG occasion 716. However, in some cases, the second uplink transmit beam for transmitting the uplink transmission 714 may not be compatible with the first downlink receive beam used for simultaneously receiving a downlink transmission in a second SPS occasion 718. In other words, the second uplink transmit beam used for transmitting the uplink transmission 714 may cause too much self-interference (e.g., an amount of self-interference above a self-interference threshold) to the first downlink receive beam used for receiving the downlink transmission in the second SPS occasion 718.

In such cases, to avoid the self-interference, the UE may be configured to drop (e.g., not receive) the downlink transmission in the second SPS occasion 718, which may increase latency associated with receiving the downlink transmission and lead to poor user experience. Additionally, dropping the reception of the downlink transmission in the second SPS occasion 718 may lead to the base station re-transmitting the downlink transmission, which unnecessarily consumes time and frequency resources within a wireless communication network. A similar scenario as FIG. 7 is illustrated in FIG. 8.

For example, FIG. 8 illustrates a scenario in which a UE is dynamically scheduled with a downlink transmission (e.g., PDSCH transmission) that overwrites an existing SPS occasion. As illustrated, the UE may receive a first DCI message 802. The first DCI message may include information activating an SPS configuration including a set of SPS occasions 804 and activating a CG configuration including a set of CG occasions 806. As shown, SPS occasions in the set of SPS occasions 804 and CG occasions in the set of CG occasions 806 may overlap in time. Thus, the UE may communicate transmissions in the SPS occasions in the set of SPS occasions 804 and CG occasions in the set of CG occasions 806 simultaneously, using full duplex communication.

In some cases, the first DCI message 802 may also configure the UE with a downlink receive beam for receiving downlink transmissions in the SPS occasions of the set of SPS occasions 804. Likewise, the first DCI message may also configure the UE with an uplink transmit beam for transmitting uplink transmissions in the CG occasions of the set of CG occasions 806. Accordingly, for example, the UE may receive a first downlink transmission from a base station using the first downlink receive beam in SPS occasion 808 while simultaneously transmitting a first uplink transmission using the first uplink transmit beam in CG occasion 810.

Thereafter, the UE may receive a second DCI message 812. In some cases, the second DCI message 812 may include a dynamic grant that dynamically schedules the UE to receive a downlink transmission 814, such as a PDSCH transmission, that at least partially overwrites existing downlink transmissions in a second SPS occasion 816. In other words, the dynamic grant may cause the UE to drop the existing downlink transmissions in the second SPS occasion 816 and instead dynamically receive the downlink transmission 814. While FIG. 8 only illustrates a single downlink transmission 814 that overwrites an existing SPS occasion (e.g., the second SPS occasion 816), it should be understood that the second DCI message 812 may schedule the UE to transmit additional overwriting transmissions in additional SPS occasions.

In some cases, the second DCI message 812 may also configure the UE with a second downlink receive beam for receiving the downlink transmission 814 during the overwritten second SPS occasion 816. However, in some cases, the second downlink receive beam for receiving the downlink transmission 814 may not be compatible with the first uplink transmit beam used for simultaneously transmitting an uplink transmission in a second CG occasion 818. In other words, the second downlink receive beam used for receiving the downlink transmission 814 may cause too much self-interference (e.g., an amount of self-interference above a self-interference threshold) to the first uplink transmit beam used for transmitting the uplink transmission in the second CG occasion 818.

In such cases, to avoid the self-interference, the UE may be configured to drop (e.g., not transmit) the uplink transmission in the second CG occasion 818, which may increase latency associated with transmitting the uplink transmission and lead to poor user experience and wasted processing and power resources at the UE.

Accordingly, as can be seen from the example illustrated in FIGS. 7-8, there may be instances where a UE is dynamically scheduled to communicate an overwriting transmission using a beam that is not compatible with a beam used for transmitting or receiving transmissions in existing CG occasions and SPS occasions, respectively, which may lead to negative effects (e.g., increased latency, wasted time resources, wasted frequency resources, wasted processing resources, and/or wasted power resources).

Thus, aspects of the present disclosure provide techniques for managing scenarios during full duplex communication in which a scheduling occasion becomes overwritten by a dynamic grant. For example, to help reduce the negative effects described above, the techniques presented may be used by a UE to determine whether or not to proceed with communicating (e.g., transmitting or receiving) a transmission in a first scheduling occasion using a beam that conflicts with a beam used for communicating (e.g., transmitting or receiving) a transmission associated with the dynamic grant in an overwritten scheduling occasion that overlaps with the first scheduling occasion.

Example Call Flow Illustrating Operations for
Communicating Dynamically Scheduled
Transmissions that Overwrite Transmissions in
Semi-Statically Configured Scheduling Occasions
for Full Duplex FIG. 9 is a call flow diagram illustrating example operations 900 between a BS 902 and a UE 904 for communicating dynamically scheduled transmissions (e.g., PDSCH transmission or PUSCH transmissions) that overwrite transmissions in existing semi-statically configured scheduling occasions (e.g., SPS occasions or CG occasions). In some cases, the BS 902 may be an example of the BS 102 in the wireless communication network 100 illustrated in FIG. 1.

Similarly, the UE 904 may be an example of the UE 104 illustrated in FIG. 1 and may include a plurality of antenna panels that may be used for FD communication. Further, as shown, a Uu interface may be established to facilitate communication between the BS 902 and UE 904, however, in other aspects, a different type of interface may be used.

As shown, the operations 900 illustrated in FIG. 9 begin at 910 with the BS 902 transmitting, to the UE 904, semi-static scheduling configuration information. In some cases, the semi-static scheduling configuration information may include a first semi-static scheduling configuration and a second semi-static scheduling configuration for full duplex communication. Further, in some cases, the first semi-static scheduling configuration comprises at least one SPS occasion in which the UE 904 is scheduled to receive a downlink transmission from the BS 902. Additionally, in some cases, the second semi-static scheduling configuration comprises at least one CG occasion in which the UE 904 is scheduled to transmit an uplink transmission to the BS 902. In some cases, the at least one CG occasion at least partially overlaps in time with the at least one SPS occasion and, as such, full duplex communication may be used when receiving the downlink transmission in the at least one SPS occasion and transmitting the uplink transmission in the at least one CG occasion.

Thereafter, as illustrated at 920, the BS 902 transmits a first control message to the UE 904, activating the first semi-static scheduling configuration and the second semi-static scheduling configuration for the full duplex communication. In some cases, the first control message may include a downlink control information (DCI) message. The first control message, in some cases, may indicate a first downlink receive beam for receiving the downlink transmission in the at least one SPS occasion and a first uplink transmit beam for transmitting the uplink transmission in the at least one CG occasion. In some case, the first downlink receive beam may be associated with a first antenna panel of the UE 904 and the first uplink transmit beam may be associated with a second antenna panel of the UE 904.

Thereafter, as illustrated at 930, the BS 902 transmits a second control message to the UE 904. The second control message may be a DCI message and comprise a dynamic grant that schedules a transmission associated with the UE that overwrites at least one of the downlink transmission in the at least one SPS occasion or the uplink transmission in the at least one CG occasion.

Thereafter, as illustrated at 940, the UE 904 takes one or more actions, based on the dynamic grant, to communicate, with the BS 902, at least the transmission that overwrites (e.g., the overwriting transmission) the at least one of the downlink transmission in the at least one SPS occasion or the uplink transmission in the at least one CG occasion. As shown at 950, taking the one or more actions may include communicating the transmission that overwrites the at least one of the downlink transmission in the at least one SPS occasion or the uplink transmission in the at least one CG occasion with the BS 902. Taking the one or more actions in block 940 may also include other actions as described below.

Aspects Related to Dynamically Scheduled Uplink Transmissions that Overwrite CG Occasions In some cases, the transmission that is scheduled by the second control message received at 930 in FIG. 9 comprises a PUSCH transmission. In such cases, the PUSCH transmission overwrites the uplink transmission in the at least one CG occasion that at least partially overlaps in time with the at least one SPS occasion. This scenario is illustrated in FIG. 7. For example, the second control message received at 930 in FIG. 9 may include the second DCI message 712 in FIG. 7 and the transmission that is scheduled by the second control message in FIG. 9 may include the uplink (e.g., PUSCH) transmission 714 in FIG. 7. Similarly, the at least one SPS occasion in FIG. 9 may include the second SPS occasion 718 in FIG. 7.

Further, when the transmission that is scheduled by the second control message is a PUSCH transmission, the second control message may indicate an uplink transmit beam for transmitting the PUSCH transmission associated with the second antenna panel of the UE or another antenna panel of the UE 904. In some cases, however, the uplink transmit beam for transmitting the PUSCH transmission may not be compatible with the first downlink receive beam for receiving the downlink transmission in the at least one SPS occasion (e.g., received by the UE 904 in the first control message at 920 in FIG. 9). In other words, the uplink transmit beam for transmitting the PUSCH transmission may cause too much self-interference (e.g., greater than or equal to a self-interference threshold) to the downlink receive beam used for receiving the downlink transmission in the at least one SPS occasion.

In such cases, the UE 904 may take one or more actions (e.g., in block 940) to communicate the PUSCH transmission while reducing or avoiding self-interference caused to the downlink transmission in the at least one SPS occasion. For example, in some cases, to reduce or avoid the self-interference caused to the downlink transmission in the at least one SPS occasion, a new field or a reserved/unused field in the second control message that schedules the PUSCH transmission may be used to indicate another downlink receive beam for the at least one SPS occasion that is overlapped with the PUSCH transmission.

More specifically, the second control message received at 930 in FIG. 9 may further indicate a second downlink receive beam for receiving the downlink transmission in the at least one SPS occasion that is compatible (e.g., self-interference below a self-interference threshold) with the uplink transmit beam for transmitting the PUSCH transmission. In such cases, taking the one or more actions to communicate at least the overwriting transmission (e.g., transmitting the PUSCH transmission) in block 940 of FIG. 9 may include simultaneously receiving the downlink transmission in the at least one SPS occasion using the second downlink receive beam and transmitting the PUSCH transmission using the uplink transmit beam. Accordingly, in addition to communicating the (e.g., transmitting) at least the PUSCH transmission, the operations shown at 950 may also include simultaneously receiving the downlink transmission in the at least one SPS occasion using the second downlink receive beam.

In some cases, in addition to indicating the second downlink receive beam for receiving the downlink transmission in the at least one SPS occasion, the second control message received at 930 in FIG. 9 further includes at least one identifier that identifies one or more specific SPS occasions of the at least one SPS occasion to use the second downlink receive beam to receive the downlink transmission. Accordingly, the UE 904 may use the second downlink receive beam to receive the downlink transmission(s) in the one or more specific SPS occasions. Thereafter, the UE 904 may use the first downlink receive beam (e.g., received in the first control message at 920) to receive other downlink transmissions in SPS occasions of the at least one SPS occasion other than the one or more specific SPS occasions identified by the at least one identifier.

In some cases, to reduce or avoid the self-interference caused to the downlink transmission in the at least one SPS occasion when transmitting the dynamically scheduled PUSCH transmission that overlaps the downlink transmission in the at least one SPS occasion, the second control message received at 930 may further include an indication specifying whether or not to drop reception of the downlink transmission in the at least one SPS occasion. For example, in some cases, the indication in the second control message specifies to drop the reception of the downlink transmission in the at least one SPS occasion. In this case, taking the one or more actions to communicate the overwriting transmission (e.g., transmitting the PUSCH transmission) in block 940 of FIG. 9 may include transmitting the PUSCH transmission as shown at 950 and not receiving the downlink transmission in the at least one SPS occasion based on the indication specifying to drop the reception of the downlink transmission in the at least one SPS occasion. In some cases, the indication in the second control message specifying to drop the reception of the downlink transmission in the at least one SPS occasion may further indicate one or more specific SPS occasions of the at least one SPS occasion to drop the reception of the downlink transmission. In such cases, not receiving the downlink transmission in the at least one SPS occasion comprises not receiving the downlink transmission in the one or more specific SPS occasions indicated in the second control message.

In some cases, the indication in the second control message received at 930 may specify to keep the reception of the downlink transmission in the at least one SPS occasion. In this case, taking the one or more actions to communicate the overwriting transmission (e.g., transmitting the PUSCH transmission) in block 940 of FIG. 9 may include transmitting the PUSCH transmission as shown at 950 and simultaneously receiving the downlink transmission in the at least one SPS occasion based on the indication specifying to keep the reception of the downlink transmission in the at least one SPS occasion.

In some cases, to reduce or avoid the self-interference caused to the downlink transmission in the at least one SPS occasion when transmitting the dynamically scheduled PUSCH transmission that overlaps the downlink transmission in the at least one SPS occasion, the UE 904 may autonomously determine whether the first downlink receive beam for receiving the downlink transmission in the at least one SPS occasion is compatible with the uplink transmit beam for transmitting the PUSCH transmission. Thereafter, in some cases, the UE 904 may use a rule specified in a wireless communications standard to determine whether to drop or keep the reception of the downlink transmission in the at least one SPS occasion based on the compatibility between the first downlink receive beam used for receiving the downlink transmission in the at least one SPS occasion and the uplink beam used for transmitting the PUSCH transmission, as explained below. In other cases, based on the determined compatibility, the UE 904 may determine whether or not to switch the first downlink receive beam for receiving the downlink transmission in the at least one SPS occasion or the uplink transmit beam for transmitting the PUSCH transmission, as explained below.

In some cases, the UE 904 may make this determination based on at least one of beam management measurements or a set of preconfigured candidate downlink and uplink beam pairs. For example, the UE 904 may perform beam management measurements to measure a level of self-interference caused by the uplink transmit beam for transmitting the PUSCH transmission to the first downlink receive beam for receiving the downlink transmission in the at least one SPS occasion. If the level of self-interference is greater than or equal to a self-interference threshold, the UE 904 may determine that the first downlink receive beam is not compatible with the uplink transmit beam. In other cases, when the level of self-interference is less than the self-interference threshold, the UE 904 may determine that the first downlink receive beam is compatible with the uplink transmit beam.

In other cases, the UE 904 may be preconfigured with a list of candidate downlink and uplink beam pairs, indicating downlink and uplink beam pairs that are compatible with each other. In some cases, each downlink receive beam in the list of candidate downlink and uplink beam pairs may be paired with one or more compatible uplink transmit beams and vice versa. Accordingly, when the UE 904 receives the indication of the uplink transmit beam for transmitting the PUSCH transmission in the second control message, the UE 904 may search the list of candidate downlink and uplink beam pairs to determine whether there is an existing beam pair including the uplink transmit beam and first downlink receive beam. If the UE 904 finds an existing beam pair including the uplink transmit beam and first downlink receive beam within the list, the UE 904 may conclude that the uplink transmit beam is compatible with the first downlink receive beam. Otherwise, the UE 904 may conclude that the uplink transmit beam is not compatible with the first downlink receive beam.

The UE 904 may then take the one or more actions in block 940 of FIG. 9 based on the determination of whether the first downlink receive beam for receiving the downlink transmission in the at least one SPS occasion is compatible with the uplink transmit beam for transmitting the PUSCH transmission. For example, when the first downlink receive beam is compatible with the uplink transmit beam, taking the one or more actions may include simultaneously receiving the downlink transmission in the at least one SPS occasion using the first downlink receive beam and transmitting the PUSCH transmission using the uplink transmit beam. More specifically, in addition to transmitting the PUSCH transmission at 950 in FIG. 9, the UE 904 may also simultaneously receive the downlink transmission in the at least one SPS occasion from the BS 902 at 950 using full duplex communication.

In other cases, when the first downlink receive beam is not compatible with the uplink transmit beam, taking the one or more actions in block 940 may include transmitting the PUSCH transmission using the uplink transmit beam and not receiving the downlink transmission in the at least one SPS occasion. In other words, when the first downlink receive beam is not compatible with the uplink transmit beam, the UE 904 may drop the reception of the downlink transmission in the at least one SPS occasion.

As noted above, based on the determined compatibility, the UE 904 may determine whether or not to switch the first downlink receive beam for receiving the downlink transmission in the at least one SPS occasion or the uplink transmit beam for transmitting the PUSCH transmission. For example, when the first downlink receive beam for receiving the downlink transmission in the at least one SPS occasion is not compatible with the uplink transmit beam for transmitting the PUSCH transmission, the UE 904 may select either a new downlink receive beam for receiving the downlink transmission in the at least one SPS occasion or a new uplink transmit beam for transmitting the PUSCH transmission.

More specifically, for example, in some cases, when the first downlink receive beam is not compatible with the uplink transmit beam, the UE 904 may select a second downlink receive beam for receiving the downlink transmission in the at least one SPS occasion that is compatible with the uplink transmit beam for transmitting the PUSCH transmission. In other cases, when the first downlink receive beam is not compatible with the uplink transmit beam, the UE 904 may select a second uplink transmit beam for transmitting the PUSCH transmission that is compatible with the first downlink receive beam for receiving the downlink transmission in the at least one SPS occasion. In yet other cases, the UE 904 may select both the second downlink receive beam for receiving the downlink transmission in the at least one SPS occasion and the second uplink transmit beam for transmitting the PUSCH transmission.

In some cases, the UE 904 may make the selection of the second downlink receive beam and/or second uplink transmit beam based on at least one of the beam management measurements or the set of preconfigured candidate downlink and uplink beam pairs. Further, whether the UE 904 selects the second downlink receive beam, the second uplink transmit beam, or both the second downlink receive beam and the second uplink transmit beam may be based on a rule specified in a wireless communications standard.

According to aspects, when the UE 904 selects the second downlink receive beam for receiving the downlink transmission in the at least one SPS occasion, taking the one or more actions to communicate at least the overwriting transmission (e.g., transmitting the PUSCH transmission) in block 940 of FIG. 9 may include simultaneously receiving the downlink transmission in the at least one SPS occasion using the second downlink receive beam and transmitting the PUSCH transmission using the uplink transmit beam. In other cases, when the UE 904 selects the second uplink transmit beam for transmitting the PUSCH transmission, taking the one or more actions to communicate at least the overwriting transmission (e.g., transmitting the PUSCH transmission) in block 940 of FIG. 9 may include simultaneously receiving the downlink transmission in the at least one SPS occasion using the first downlink receive beam and transmitting the PUSCH transmission using the second uplink transmit beam. In yet other cases, when the UE 904 selects both the second downlink receive beam for receiving the downlink transmission in the at least one SPS occasion and the second uplink transmit beam for transmitting the PUSCH transmission, taking the one or more actions to communicate at least the overwriting transmission (e.g., transmitting the PUSCH transmission) in block 940 of FIG. 9 may include simultaneously receiving the downlink transmission in the at least one SPS occasion using the second downlink receive beam and transmitting the PUSCH transmission using the second uplink transmit beam.

In some cases, reducing or avoiding the self-interference caused to the downlink transmission in the at least one SPS occasion when transmitting the dynamically scheduled PUSCH transmission that overlaps the downlink transmission in the at least one SPS occasion may be based on a rule specified in a wireless communications standard. For example, in some cases, the rule may specify that whenever the UE 904 is dynamically scheduled with the PUSCH transmission that overlaps the downlink transmission in the at least one SPS occasion, the UE 904 should drop the reception of the downlink transmission in the at least one SPS occasion. In such cases, taking the one or more actions to communicate the overwriting transmission (e.g., transmitting the PUSCH transmission) in block 940 of FIG. 9 may include transmitting the PUSCH transmission as shown at 950 and not receiving the downlink transmission in the at least one SPS occasion based on the rule specifying to drop the reception of the downlink transmission in the at least one SPS occasion.

In other cases, the rule may specify that whenever the UE 904 is dynamically scheduled with the PUSCH transmission that overlaps the downlink transmission in the at least one SPS occasion, the UE 904 should keep the reception of the downlink transmission in the at least one SPS occasion. In such cases, taking the one or more actions to communicate at least the overwriting transmission (e.g., transmitting the PUSCH transmission) in block 940 of FIG. 9 may include simultaneously receiving the downlink transmission in the at least one SPS occasion using the first downlink receive beam and transmitting the PUSCH transmission using the uplink transmit beam. Accordingly, in addition to communicating the (e.g., transmitting) at least the PUSCH transmission, the operations shown at 950 may also include simultaneously receiving the downlink transmission in the at least one SPS occasion using the first downlink receive beam.

In some cases, to reduce or avoid the self-interference caused to the downlink transmission in the at least one SPS occasion when transmitting the dynamically scheduled PUSCH transmission that overlaps the downlink transmission in the at least one SPS occasion, the second control message received at 930 in FIG. 9 may include a bi-directional transmission configuration indicator (TCI) state for the downlink transmission in the at least one SPS occasion and the PUSCH transmission. The bi-directional TCI state may include spatial relationship information that indicates a set of beams for receiving downlink transmissions and transmitting uplink transmissions. In some cases, the bi-directional TCI state may be used to indicate a pair of compatible downlink and uplink beams that may be used for receiving the downlink transmission in the at least one SPS occasion and for transmitting the PUSCH transmission. For example, the bi-directional TCI state received in the second control message may indicate (via spatial relationship information) a second downlink receive beam for receiving the downlink transmission in the at least one SPS occasion and may also indicate the uplink transmit beam for transmitting the PUSCH transmission.

In such cases, taking the one or more actions to communicate at least the overwriting transmission (e.g., transmitting the PUSCH transmission) in block 940 of FIG. 9 may include simultaneously receiving the downlink transmission in the at least one SPS occasion using the second downlink receive beam indicated by the bi-directional TCI state and transmitting the PUSCH transmission using the uplink transmit beam indicated by the bi-directional TCI state. Accordingly, in addition to communicating the (e.g., transmitting) at least the PUSCH transmission using the uplink transmit beam indicated by the bi-directional TCI state, the operations shown at 950 may also include simultaneously receiving the downlink transmission in the at least one SPS occasion using the second downlink receive beam indicated by the bi-directional TCI state.

In some cases, in addition to indicating the bi-directional TCI state for the downlink transmission in the at least one SPS occasion and the PUSCH transmission, the second control message received at 930 in FIG. 9 may further include at least one identifier that identifies one or more specific SPS occasions of the at least one SPS occasion to use the bi-directional TCI state to receive the downlink transmission in the at least one SPS occasions and to transmit the PUSCH transmission. Accordingly, the UE 904 may use the bi-directional TCI state to receive the downlink transmission(s) in the one or more specific SPS occasions and to simultaneously transmit the PUSCH transmission.

Aspects Related to Dynamically Scheduled Uplink Transmissions that Overwrite CG Occasions In some cases, the transmission that is scheduled by the second control message received at 930 in FIG. 9 comprises a PDSCH transmission. In such cases, the PDSCH transmission overwrites the downlink transmission in the at least one SPS occasion that at least partially overlaps in time with the at least one CG occasion. This scenario is illustrated in FIG. 8. For example, the second control message received at 930 in FIG. 9 may include the second DCI message 712 in FIG. 7 and the transmission that is scheduled by the second control message in FIG. 9 may include the downlink (e.g., PDSCH) transmission 814 in FIG. 7. Similarly, the at least one CG occasion in FIG. 9 may include the second CG occasion 818 in FIG. 8.

Further, when the transmission that is scheduled by the second control message is a PDSCH transmission, the second control message may indicate a downlink receive beam for receiving the PDSCH transmission associated with the first antenna panel of the UE or another antenna panel of the UE 904. In some cases, however, the downlink receive beam for receiving the PDSCH transmission may not be compatible with the first uplink transmit beam for transmitting the uplink transmission in the at least one CG occasion (e.g., received by the UE 904 in the first control message at 920 in FIG. 9). In other words, the downlink receive beam for receiving the PDSCH transmission may cause too much self-interference (e.g., greater than or equal to a self-interference threshold) to the uplink transmit beam used for transmitting the uplink transmission in the at least one CG occasion.

In such cases, the UE 904 may take one or more actions (e.g., in block 940) to communicate the PDSCH transmission while reducing or avoiding self-interference caused to the uplink transmission in the at least one CG occasion. For example, in some cases, to reduce or avoid the self-interference caused to the uplink transmission in the at least one CG occasion, a new field or a reserved/unused field in the second control message that schedules the PDSCH transmission may be used to indicate another uplink transmit beam for the at least one CG occasion that is overlapped with the PDSCH transmission.

More specifically, the second control message received at 930 in FIG. 9 may further indicate a second uplink transmit beam for transmitting the uplink transmission in the at least one CG occasion that is compatible (e.g., self-interference below a self-interference threshold) with the downlink receive beam for receiving the PDSCH transmission. In such cases, taking the one or more actions to communicate at least the overwriting transmission (e.g., receiving the PDSCH transmission from the BS 902) in block 940 of FIG. 9 may include simultaneously transmitting the uplink transmission in the at least one CG occasion using the second uplink transmit beam and receiving the PDSCH transmission using the downlink receive beam indicated in the second control message. Accordingly, in addition to communicating (e.g., receiving) at least the PDSCH transmission, the operations shown at 950 may also include simultaneously transmitting the uplink transmission in the at least one CG occasion using the second uplink transmit beam.

In some cases, in addition to indicating the second uplink transmit beam for transmitting the uplink transmission in the at least one CG occasion, the second control message received at 930 in FIG. 9 further includes at least one identifier that identifies one or more specific CG occasions of the at least one CG occasion to use the second uplink transmit beam to transmit the uplink transmission. Accordingly, the UE 904 may use the second uplink transmit beam to transmit the uplink transmission(s) in the one or more specific CG occasions. Thereafter, the UE 904 may use the first uplink transmit beam (e.g., received in the first control message at 920) to transmit other uplink transmissions in CG occasions of the at least one CG occasion other than the one or more specific CG occasions identified by the at least one identifier.

In some cases, to reduce or avoid the self-interference caused to the uplink transmission in the at least one CG occasion when receiving the dynamically scheduled PDSCH transmission that overlaps the uplink transmission in the at least one CG occasion, the second control message received at 930 may further include an indication specifying whether or not to drop transmission of the uplink transmission in the at least one CG occasion. For example, in some cases, the indication in the second control message specifies to drop the transmission of the uplink transmission in the at least one CG occasion. In this case, taking the one or more actions to communicate the overwriting transmission (e.g., receiving the PDSCH transmission from the BS 902) in block 940 of FIG. 9 may include receiving the PDSCH transmission as shown at 950 and not transmitting the uplink transmission in the at least one CG occasion based on the indication specifying to drop the transmission of the uplink transmission in the at least one CG occasion. In some cases, the indication in the second control message specifying to drop the transmission of the uplink transmission in the at least one CG occasion may further indicate one or more specific CG occasions of the at least one CG occasion to drop the transmission of the uplink transmission. In such cases, not transmitting the uplink transmission in the at least one CG occasion comprises not transmitting the uplink transmission in the one or more specific CG occasions indicated in the second control message.

In some cases, the indication in the second control message received at 930 may specify to keep the transmission of the uplink transmission in the at least one CG occasion. In this case, taking the one or more actions to communicate the overwriting transmission (e.g., receiving the PDSCH transmission from the BS 902) in block 940 of FIG. 9 may include receiving the PDSCH transmission as shown at 950 and simultaneously transmitting the uplink transmission in the at least one CG occasion based on the indication specifying to keep the transmission of the uplink transmission in the at least one CG occasion.

In some cases, to reduce or avoid the self-interference caused to the uplink transmission in the at least one CG occasion when receiving the dynamically scheduled PDSCH transmission that overlaps the uplink transmission in the at least one CG occasion, the UE 904 may autonomously determine whether the first uplink receive beam for transmitting the uplink transmission in the at least one CG occasion is compatible with the downlink receive beam for receiving the PDSCH transmission. Thereafter, in some cases, the UE 904 may use a rule specified in a wireless communications standard to determine whether to drop or keep the transmission of the uplink transmission in the at least one CG occasion based on the compatibility between the first uplink transmit beam used for transmitting the uplink transmission in the at least one CG occasion and the downlink beam used for receiving the PDSCH transmission, as explained below. In other cases, based on the determined compatibility, the UE 904 may determine whether or not to switch the first uplink transmit beam for transmitting the uplink transmission in the at least one CG occasion or the downlink receive beam for receiving the PDSCH transmission, as explained below.

In some cases, the UE 904 may make this determination based on at least one of beam management measurements or a set of preconfigured candidate downlink and uplink beam pairs. For example, the UE 904 may perform beam management measurements to measure a level of self-interference caused by the downlink receive beam for receiving the PDSCH transmission to the first uplink transmit beam for transmitting the uplink transmission in the at least one CG occasion. If the level of self-interference is greater than or equal to a self-interference threshold, the UE 904 may determine that the first uplink transmit beam is not compatible with the downlink receive beam. In other cases, when the level of self-interference is less than the self-interference threshold, the UE 904 may determine that the first uplink transmit beam is compatible with the downlink receive beam.

In other cases, the UE 904 may be preconfigured with a list of candidate downlink and uplink beam pairs, indicating downlink and uplink beam pairs that are compatible with each other. In some cases, each downlink receive beam in the list of candidate downlink and uplink beam pairs may be paired with one or more compatible uplink transmit beams and vice versa. Accordingly, when the UE 904 receives the indication of the downlink receive beam for receiving the PDSCH transmission in the second control message, the UE 904 may search the list of candidate downlink and uplink beam pairs to determine whether there is an existing beam pair including the downlink receive beam and first uplink transmit beam. If the UE 904 finds an existing beam pair including the downlink receive beam and first uplink transmit beam within the list, the UE 904 may conclude that the downlink receive beam is compatible with the first uplink transmit beam. Otherwise, the UE 904 may conclude that the downlink receive beam is not compatible with the first uplink transmit beam.

The UE 904 may then take the one or more actions in block 940 of FIG. 9 based on the determination of whether the first uplink transmit beam for transmitting the uplink transmission in the at least one CG occasion is compatible with the downlink receive beam for receiving the PDSCH transmission. For example, when the first uplink transmit beam is compatible with the downlink receive beam, taking the one or more actions may include simultaneously transmitting the uplink transmission in the at least one CG occasion using the first uplink transmit beam and receiving the PDSCH transmission using the downlink receive beam. More specifically, in addition to receiving the PDSCH transmission at 950 in FIG. 9 from the BS 902, the UE 904 may also simultaneously transmit the uplink transmission in the at least one CG occasion using full duplex communication.

In other cases, when the first uplink transmit beam is not compatible with the downlink receive beam, taking the one or more actions in block 940 may include receiving the PDSCH transmission using the downlink receive beam and not transmitting the uplink transmission in the at least one CG occasion. In other words, when the first uplink transmit beam is not compatible with the downlink receive beam, the UE 904 may drop the transmission of the uplink transmission in the at least one CG occasion.

As noted above, based on the determined compatibility, the UE 904 may determine whether or not to switch the first uplink transmit beam for transmitting the uplink transmission in the at least one CG occasion or the downlink receive beam for receiving the PDSCH transmission. For example, when the first uplink transmit beam for transmitting the uplink transmission in the at least one CG occasion is not compatible with the downlink receive beam for receiving the PDSCH transmission, the UE 904 may select either a new uplink transmit beam for transmitting the uplink transmission in the at least one CG occasion or a new downlink receive beam for receiving the PDSCH transmission.

More specifically, for example, in some cases, when the first uplink transmit beam is not compatible with the downlink receive beam, the UE 904 may select a second uplink transmit beam for transmitting the uplink transmission in the at least one CG occasion that is compatible with the downlink receive beam for receiving the PDSCH transmission. In other cases, when the first uplink transmit beam is not compatible with the downlink receive beam, the UE 904 may select a second downlink receive beam for receiving the PDSCH transmission that is compatible with the first uplink receive beam for transmitting the uplink transmission in the at least one CG occasion. In yet other cases, the UE 904 may select both the second uplink transmit beam for transmitting the uplink transmission in the at least one CG occasion and the second downlink receive beam for receiving the PDSCH transmission.

In some cases, the UE 904 may make the selection of the second uplink transmit beam and/or second downlink receive beam based on at least one of the beam management measurements or the set of preconfigured candidate downlink and uplink beam pairs. Further, whether the UE 904 selects the second downlink receive beam, the second uplink transmit beam, or both the second downlink receive beam and the second uplink transmit beam may be based on a rule specified in a wireless communications standard.

According to aspects, when the UE 904 selects the second uplink transmit beam for transmitting the uplink transmission in the at least one CG occasion, taking the one or more actions to communicate at least the overwriting transmission (e.g., receiving the PDSCH transmission from the BS 902) in block 940 of FIG. 9 may include simultaneously transmitting the uplink transmission in the at least one CG occasion using the second uplink transmit beam and receiving the PDSCH transmission using the downlink beam. In other cases, when the UE 904 selects the second downlink receive beam for receiving the PDSCH transmission, taking the one or more actions to communicate at least the overwriting transmission (e.g., receiving the PDSCH transmission from the BS 902) in block 940 of FIG. 9 may include simultaneously transmitting the uplink transmission in the at least one CG occasion using the first uplink transmit beam (e.g., indicated in the first control message received at 910) and receiving the PDSCH transmission using the second downlink receive beam. In yet other cases, when the UE 904 selects both the second uplink transmit beam for transmitting the uplink transmission in the at least one CG occasion and the second downlink receive beam for receiving the PDSCH transmission, taking the one or more actions to communicate at least the overwriting transmission (e.g., receiving the PDSCH transmission from the BS 902) in block 940 of FIG. 9 may include simultaneously transmitting the uplink transmission in the at least one CG occasion using the second uplink transmit beam and receiving the PDSCH transmission using the second downlink receive beam.

In some cases, reducing or avoiding the self-interference caused to the uplink transmission in the at least one CG occasion when receiving the dynamically scheduled PDSCH transmission that overlaps the uplink transmission in the at least one CG occasion may be based on a rule specified in a wireless communications standard. For example, in some cases, the rule may specify that whenever the UE 904 is dynamically scheduled with the PDSCH transmission that overlaps the uplink transmission in the at least one CG occasion, the UE 904 should drop the transmission of the uplink transmission in the at least one CG occasion. In such cases, taking the one or more actions to communicate the overwriting transmission (e.g., receiving the PDSCH transmission from the BS 902) in block 940 of FIG. 9 may include receiving the PDSCH transmission as shown at 950 and not transmitting the uplink transmission in the at least one CG occasion based on the rule specifying to drop the transmission of the uplink transmission in the at least one CG occasion.

In other cases, the rule may specify that whenever the UE 904 is dynamically scheduled with the PDSCH transmission that overlaps the uplink transmission in the at least one CG occasion, the UE 904 should keep the reception of the uplink transmission in the at least one CG occasion. In such cases, taking the one or more actions to communicate at least the overwriting transmission (e.g., receiving the PDSCH transmission from the BS 902) in block 940 of FIG. 9 may include simultaneously transmitting the uplink transmission in the at least one CG occasion using the first uplink transmit beam (e.g., indicated in the first control message received at 910) and transmitting the PDSCH transmission using the downlink receive beam (e.g., indicated in the second control message received at 920). Accordingly, in addition to communicating the (e.g., receiving) at least the PDSCH transmission, the operations shown at 950 may also include simultaneously transmitting the uplink transmission in the at least one CG occasion using the first uplink transmit beam.

In some cases, to reduce or avoid the self-interference caused to the uplink transmission in the at least one CG occasion when receiving the dynamically scheduled PDSCH transmission that overlaps the uplink transmission in the at least one CG occasion, the second control message received at 930 in FIG. 9 may include a bi-directional TCI state for the uplink transmission in the at least one CG occasion and the PDSCH transmission. The bi-directional TCI state may include spatial relationship information that indicates a set of beams for receiving downlink transmissions and transmitting uplink transmissions. In some cases, the bi-directional TCI state may be used to indicate a pair of compatible downlink and uplink beams that may be used for transmitting the uplink transmission in the at least one CG occasion and for receiving the PDSCH transmission. For example, the bi-directional TCI state received in the second control message may indicate (via spatial relationship information) a second uplink transmit beam for transmitting the uplink transmission in the at least one CG occasion and may also indicate the downlink receive beam for receiving the PDSCH transmission.

In such cases, taking the one or more actions to communicate at least the overwriting transmission (e.g., receiving the PDSCH transmission from the BS 902) in block 940 of FIG. 9 may include simultaneously transmitting the uplink transmission in the at least one CG occasion using the second uplink transmit beam indicated by the bi-directional TCI state and receiving the PDSCH transmission using the downlink receive beam indicated by the bi-directional TCI state. Accordingly, in addition to communicating the (e.g., receiving) at least the PDSCH transmission using the downlink receive beam indicated by the bi-directional TCI state, the operations shown at 950 may also include simultaneously transmitting the uplink transmission in the at least one CG occasion using the second uplink transmit beam indicated by the bi-directional TCI state.

In some cases, in addition to indicating the bi-directional TCI state for the uplink transmission in the at least one CG occasion and the PDSCH transmission, the second control message received at 930 in FIG. 9 may further include at least one identifier that identifies one or more specific CG occasions of the at least one CG occasion to use the bi-directional TCI state to transmit the uplink transmission in the at least one CG occasions and to receive the PDSCH transmission. Accordingly, the UE 904 may use the bi-directional TCI state to transmit the uplink transmission(s) in the one or more specific CG occasions and to simultaneously receive the PDSCH transmission.

While many of the techniques presented above are described from the perspective of the UE 904, it should be understood that the BS 902 may perform complimentary techniques to those performed by the UE 904. As one example, if the UE 904 simultaneously transmits an uplink transmission and receives a downlink transmission, it should be understood that the BS 902 also simultaneously receives the uplink transmission and transmits the downlink transmission.

Example Methods for Communicating Dynamically Scheduled Transmissions that Overwrite Transmissions in Semi-Statically Configured Scheduling Occasions for Full Duplex FIG. 10 is a flow diagram illustrating example operations 1000 for wireless communication. The operations 1000 may be performed, for example, by a BS (e.g., such as the BS 102 in the wireless communication network 100 of FIG. 1) for communicating a dynamically scheduled transmission with a UE that overwrites a transmission in a semi-statically configured scheduling occasion for full duplex. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 begin, at 1010, with transmitting a first control message to a user equipment (UE), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion.

In block 1020, the BS transmits a second control message comprising a dynamic grant that schedules a transmission associated with the UE that overwrites at least one of the downlink transmission in the at least one SPS occasion or the uplink transmission in the at least one CG occasion.

In block 1030, the BS communicates, based on the dynamic grant, at least the transmission that overwrites the at least one of the downlink transmission in the at least one SPS occasion or the uplink transmission in the at least one CG occasion with the UE.

In some cases, the transmission that is dynamically scheduled in the second control message transmitted in block 1020 comprises a physical uplink shared channel (PUSCH) transmission and overwrites the uplink transmission in the at least one CG occasion that at least partially overlaps in time with the at least one SPS occasion.

In some cases, the first control message indicates a first downlink receive beam for receiving the downlink transmission in the at least one SPS occasion. Additionally, in some cases, the second control message indicates an uplink transmit beam for transmitting the PUSCH transmission.

In some cases, the second control message further indicates a second downlink receive beam for receiving the downlink transmission in the at least one SPS occasion that is compatible with the uplink transmit beam for transmitting the PUSCH transmission. In such cases, communicating at least the transmission in block 1030 that overwrites the at least one of the downlink transmission in the at least one SPS occasion or the uplink transmission in the at least one CG occasion with the UE comprises simultaneously transmitting the downlink transmission in the at least one SPS occasion and receiving the PUSCH transmission.

In some cases, the second control message includes at least one identifier that identifies one or more specific SPS occasions of the at least one SPS occasion to use the second downlink receive beam to receive the downlink transmission.

In some cases, the second control message further includes an indication specifying whether or not to drop reception of the downlink transmission in the at least one SPS occasion. For example, in some cases, the indication specifies to drop the reception of the downlink transmission in the at least one SPS occasion. In this case, communicating at least the transmission in block 1030 that overwrites the at least one of the downlink transmission in the at least one SPS occasion or the uplink transmission in the at least one CG occasion with the UE comprises: receiving the PUSCH transmission and not transmitting the downlink transmission in the at least one SPS occasion based on the indication specifying to drop the reception of the downlink transmission in the at least one SPS occasion.

In some cases, the indication specifying to drop the reception of the downlink transmission in the at least one SPS occasion further indicates one or more specific SPS occasions of the at least one SPS occasion to drop the reception of the downlink transmission. In this case, not transmitting the downlink transmission in the at least one SPS occasion comprises not transmitting the downlink transmission in the one or more specific SPS occasions.

In some cases, based on a rule specified in a wireless communications standard, communicating at least the transmission in block 1030 that overwrites the at least one of the downlink transmission in the at least one SPS occasion or the uplink transmission in the at least one CG occasion with the UE comprises one of: simultaneously transmitting the downlink transmission in the at least one CG occasion and receiving the PUSCH transmission, or receiving the PUSCH transmission and not transmitting the downlink transmission in the at least one SPS occasion.

In some cases, the second control message includes a bi-directional transmission configuration indicator (TCI) state. In some cases, the bi-directional TCI state indicates a second downlink receive beam for receiving the downlink transmission in the at least one SPS occasion and the uplink transmit beam for transmitting the PUSCH transmission. In some cases, communicating at least the transmission in block 1030 that overwrites the at least one of the downlink transmission in the at least one SPS occasion or the uplink transmission in the at least one CG occasion with the UE comprises, based on the bi-directional TCI state, simultaneously transmitting the downlink transmission in the at least one SPS occasion and receiving the PUSCH transmission.

In some cases, the transmission that is dynamically scheduled in the second control message transmitted in block 1020 comprises a physical downlink shared channel (PDSCH) transmission and overwrites the downlink transmission in the at least one SPS occasion.

In some cases, the first control message indicates a first uplink transmit beam for transmitting the uplink transmission in the at least one CG occasion and the second control message indicates a downlink receive beam for receiving the PDSCH transmission.

In some cases, the second control message further indicates a second uplink transmit beam for transmitting the uplink transmission in the at least one CG occasion that is compatible with the downlink receive beam for receiving the PDSCH transmission. In such cases, communicating at least the transmission in block 1030 that overwrites the at least one of the downlink transmission in the at least one SPS occasion or the uplink transmission in the at least one CG occasion with the UE comprises simultaneously transmitting the PDSCH transmission and receiving the uplink transmission in the at least one CG occasion.

In some cases, the second control message includes at least one identifier that identifies one or more specific CG occasions of the at least one CG occasion to use the second uplink transmit beam to transmit the uplink transmission.

In some cases, the second control message further includes an indication specifying whether or not to drop transmission of the uplink transmission in the at least one CG occasion. For example, in some cases, the indication specifies to drop the transmission of the uplink transmission in the at least one CG occasion. In this case, communicating at least the transmission in block 1030 that overwrites the at least one of the downlink transmission in the at least one SPS occasion or the uplink transmission in the at least one CG occasion with the UE comprises transmitting the PDSCH transmission and not receiving the uplink transmission in the at least one CG occasion based on the indication specifying to drop the transmission of the uplink transmission in the at least one CG occasion.

In some cases, the indication specifying to drop the transmission of the uplink transmission in the at least one CG occasion further indicates one or more specific CG occasions of the at least one CG occasion to drop the transmission of the uplink transmission. In this case, not receiving the uplink transmission in the at least one CG occasion comprises not receiving the uplink transmission in the one or more specific CG occasions.

In some cases, based on a rule specified in a wireless communications standard, communicating at least the transmission in block 1030 that overwrites the at least one of the downlink transmission in the at least one SPS occasion or the uplink transmission in the at least one CG occasion with the UE comprises one of: simultaneously receiving the uplink transmission in the at least one CG occasion and transmitting the PDSCH transmission, or transmitting the PDSCH transmission and not receiving the uplink transmission in the at least one CG occasion.

In some cases, the second control message includes a bi-directional transmission configuration indicator (TCI) state. In some cases, the bi-directional TCI state indicates: a second uplink transmit beam for transmitting the uplink transmission in the at least one CG occasion, and the downlink receive beam for receiving the PDSCH transmission. In some cases, communicating at least the transmission in block 1030 that overwrites the at least one of the downlink transmission in the at least one SPS occasion or the uplink transmission in the at least one CG occasion with the UE comprises, based on the bi-directional TCI state, simultaneously receiving the uplink transmission in the at least one CG occasion and transmitting the PDSCH transmission.

Figure 11:
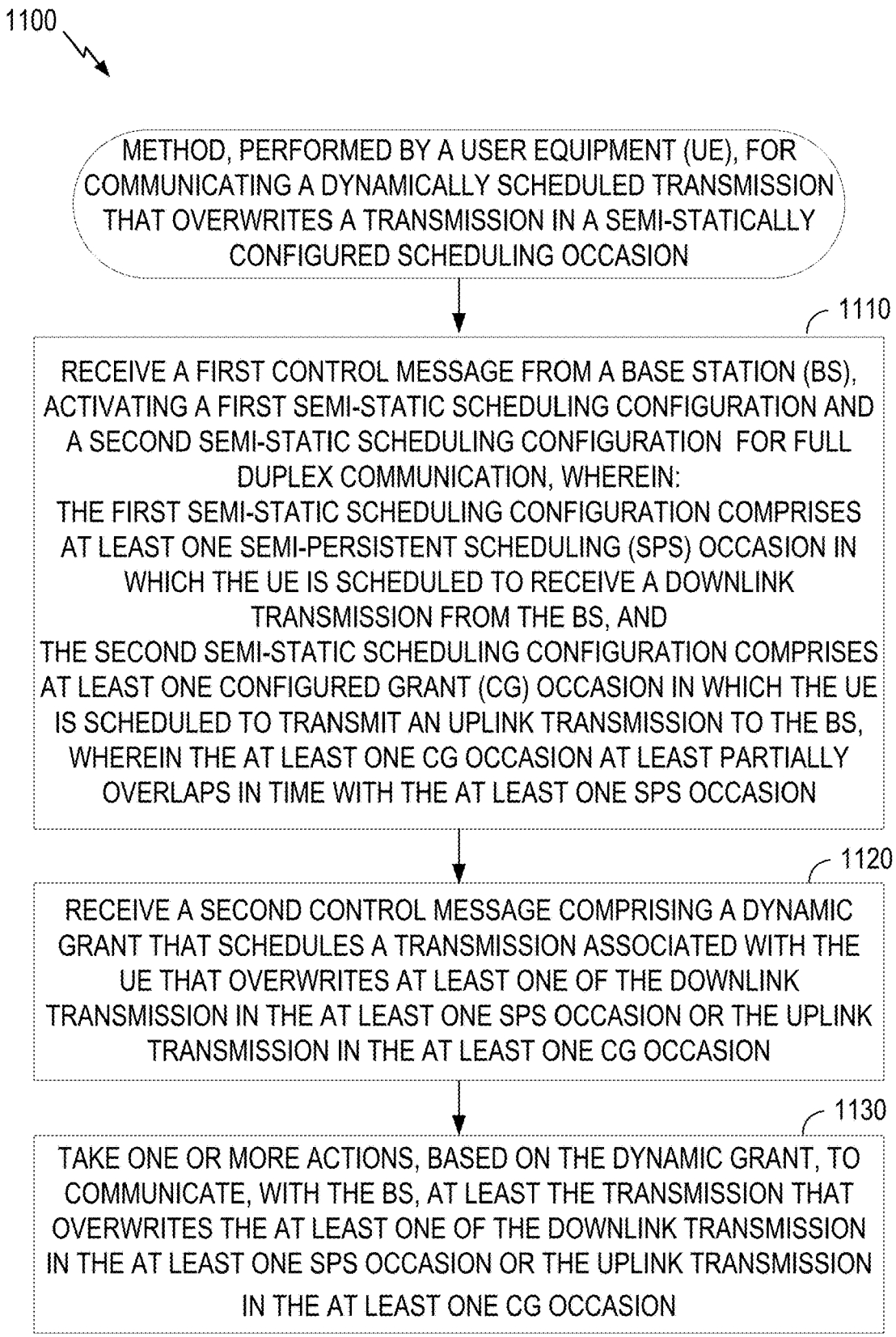
FIG. 11 is a flow diagram illustrating example operations for wireless communication by a user equipment.

FIG. 11 is a flow diagram illustrating example operations 1100 for wireless communication, in accordance with certain aspects of the present disclosure. The operations 1100 may be performed, for example, by a UE (e.g., such as the UE 104 in the wireless communication network 100 of FIG. 1) for communicating a dynamically scheduled transmission with a BS that overwrites a transmission in a semi-statically configured scheduling occasion for full duplex. The operations 1100 may be complementary to the operations 1000 performed by the BS in FIG. 10. The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 begin, at 1110, with receiving a first control message from a base station (BS), activating a first semi-static scheduling configuration and a second semi-static scheduling configuration for full duplex communication. In some cases, the first semi-static scheduling configuration comprises at least one semi-persistent scheduling (SPS) occasion in which the UE is scheduled to receive a downlink transmission from the BS. Additionally, in some cases, the second semi-static scheduling configuration comprises at least one configured grant (CG) occasion in which the UE is scheduled to transmit an uplink transmission to the BS, wherein the at least one CG occasion at least partially overlaps in time with the at least one SPS occasion.

In block 1120, the UE receives a second control message comprising a dynamic grant that schedules a transmission associated with the UE that overwrites at least one of the downlink transmission in the at least one SPS occasion or the uplink transmission in the at least one CG occasion.

In block 1130, the UE takes one or more actions, based on the dynamic grant, to communicate, with the BS, at least the transmission that overwrites the at least one of the downlink transmission in the at least one SPS occasion or the uplink transmission in the at least one CG occasion.

In some cases, the transmission that is dynamically scheduled in the second control message received in block 1120 comprises a physical uplink shared channel (PUSCH) transmission and overwrites the uplink transmission in the at least one CG occasion that at least partially overlaps in time with the at least one SPS occasion.

In some cases, the first control message indicates a first downlink receive beam for receiving the downlink transmission in the at least one SPS occasion. Additionally, in some cases, the second control message indicates an uplink transmit beam for transmitting the PUSCH transmission.

In some cases, the second control message further indicates a second downlink receive beam for receiving the downlink transmission in the at least one SPS occasion that is compatible with the uplink transmit beam for transmitting the PUSCH transmission. In this case, taking the one or more actions in block 1130 to communicate, with the BS, the transmission that overwrites the at least one of the downlink transmission in the at least one SPS occasion or the uplink transmission in the at least one CG occasion comprises simultaneously receiving the downlink transmission in the at least one SPS occasion using the second downlink receive beam and transmitting the PUSCH transmission using the uplink transmit beam.

In some cases, the second control message includes at least one identifier that identifies one or more specific SPS occasions of the at least one SPS occasion to use the second downlink receive beam to receive the downlink transmission. In such cases, the operations 1100 may also include using the first downlink receive beam to receive other downlink transmissions in SPS occasions of the at least one SPS occasion other than the one or more specific SPS occasions identified by the at least one identifier.

In some cases, the second control message further includes an indication specifying whether or not to drop reception of the downlink transmission in the at least one SPS occasion. For example, in some cases, the indication specifies to drop the reception of the downlink transmission in the at least one SPS occasion. In this case, taking the one or more actions in block 1130 to communicate, with the BS, the transmission that overwrites the at least one of the downlink transmission in the at least one SPS occasion or the uplink transmission in the at least one CG occasion comprises: transmitting the PUSCH transmission and not receiving the downlink transmission in the at least one SPS occasion based on the indication specifying to drop the reception of the downlink transmission in the at least one SPS occasion.

In some cases, the indication specifying to drop the reception of the downlink transmission in the at least one SPS occasion further indicates one or more specific SPS occasions of the at least one SPS occasion to drop the reception of the downlink transmission. In this case, not receiving the downlink transmission in the at least one SPS occasion comprises not receiving the downlink transmission in the one or more specific SPS occasions.

In some cases, operations 1100 further include determining whether the first downlink receive beam for receiving the downlink transmission in the at least one SPS occasion is compatible with the uplink transmit beam for transmitting the PUSCH transmission based on at least one of beam management measurements or a set of preconfigured candidate downlink and uplink beam pairs. In some cases, taking the one or more actions in block 1130 to communicate the transmission that overwrites the at least one of the downlink transmission in the at least one SPS occasion or the uplink transmission in the at least one CG occasion comprises, when the first downlink receive beam is compatible with the uplink transmit beam, simultaneously receiving the downlink transmission in the at least one SPS occasion using the first downlink receive beam and transmitting the PUSCH transmission using the uplink transmit beam. In other cases, taking the one or more actions in block 1130 to communicate the transmission that overwrites the at least one of the downlink transmission in the at least one SPS occasion or the uplink transmission in the at least one CG occasion comprises, when the first downlink receive beam is not compatible with the uplink transmit beam transmitting the PUSCH transmission using the uplink transmit beam and not receiving the downlink transmission in the at least one SPS occasion.

In some cases, based on a rule specified in a wireless communications standard, taking the one or more actions in block 1130 to communicate the transmission that overwrites the at least one of the downlink transmission in the at least one SPS occasion or the uplink transmission in the at least one CG occasion comprises one of: simultaneously receiving the downlink transmission in the at least one SPS occasion using the first downlink receive beam and transmitting the PUSCH transmission using the uplink transmit beam, or transmitting the PUSCH transmission using the uplink transmit beam and not receiving the downlink transmission in the at least one SPS occasion.

In some cases, the second control message includes a bi-directional transmission configuration indicator (TCI) state. In some cases, the bi-directional TCI state indicates a second downlink receive beam for receiving the downlink transmission in the at least one SPS occasion and the uplink transmit beam for transmitting the PUSCH transmission. In some cases, taking the one or more actions in block 1130 to communicate the transmission that overwrites the at least one of the downlink transmission in the at least one SPS occasion or the uplink transmission in the at least one CG occasion comprises simultaneously receiving the downlink transmission in the at least one SPS occasion using the second downlink receive beam indicated by the bi-directional TCI state and transmitting the PUSCH transmission using the uplink transmit beam indicated by the bi-directional TCI state.

In some cases, operations 1100 further include, based on at least one of beam management measurements or a set of preconfigured candidate downlink and uplink beam pairs, one of: selecting a second downlink receive beam for receiving the downlink transmission in the at least one SPS occasion that is compatible with the uplink transmit beam for transmitting the PUSCH transmission or selecting a second uplink transmit beam for transmitting the PUSCH transmission that is compatible with the first downlink receive beam for receiving the downlink transmission in the at least one SPS occasion.

In some cases, taking the one or more actions in block 1130 to communicate the transmission that overwrites the at least one of the downlink transmission in the at least one SPS occasion or the uplink transmission in the at least one CG occasion comprises one of: simultaneously receiving the downlink transmission in the at least one SPS occasion using the second downlink receive beam and transmitting the PUSCH transmission using the uplink transmit beam, or simultaneously receiving the downlink transmission in the at least one SPS occasion using the first downlink receive beam and transmitting the PUSCH transmission using the second uplink transmit beam.

In some cases, the transmission that is dynamically scheduled in the second control message received in block 1120 comprises a physical downlink shared channel (PDSCH) transmission and overwrites the downlink transmission in the at least one SPS occasion. In some cases, the first control message indicates a first uplink transmit beam for transmitting the uplink transmission in the at least one CG occasion, and the second control message indicates a downlink receive beam for receiving the PDSCH transmission.

In some cases, the second control message further indicates a second uplink transmit beam for transmitting the uplink transmission in the at least one CG occasion that is compatible with the downlink receive beam for receiving the PDSCH transmission. In such cases, taking the one or more actions in block 1130 to communicate, with the BS, the transmission that overwrites the at least one of the downlink transmission in the at least one SPS occasion or the uplink transmission in the at least one CG occasion comprises simultaneously receiving the PDSCH transmission using the downlink receive beam and transmitting the uplink transmission in the at least one CG occasion using the second uplink transmit beam.

In some cases, the second control message includes at least one identifier that identifies one or more specific CG occasions of the at least one CG occasion to use the second uplink transmit beam to transmit the uplink transmission. In such cases, operations 1100 may further include using the first uplink transmit beam to transmit other uplink transmissions in CG occasions of the at least one CG occasion other than the one or more specific CG occasions identified by the at least one identifier.

In some cases, the second control message further includes an indication specifying whether or not to drop transmission of the uplink transmission in the at least one CG occasion. For example, in some cases, the indication specifies to drop the transmission of the uplink transmission in the at least one CG occasion. In this case, taking the one or more actions in block 1130 to communicate, with the BS, the transmission that overwrites the at least one of the downlink transmission in the at least one SPS occasion or the uplink transmission in the at least one CG occasion comprises: receiving the PDSCH transmission and not transmitting the uplink transmission in the at least one CG occasion based on the indication specifying to drop the transmission of the uplink transmission in the at least one CG occasion.

In some cases, the indication specifying to drop the transmission of the uplink transmission in the at least one CG occasion further indicates one or more specific CG occasions of the at least one CG occasion to drop the transmission of the uplink transmission. In this case, not transmitting the uplink transmission in the at least one CG occasion comprises not transmitting the uplink transmission in the one or more specific CG occasions.

In some cases, operations 1100 may further include determining whether the first uplink transmit beam for transmitting the uplink transmission in the at least one CG occasion is compatible with the downlink receive beam for receiving the PDSCH transmission based on at least one of beam management measurements or a set of preconfigured candidate downlink and uplink beam pairs. In some cases, taking the one or more actions in block 1130 to communicate the transmission that overwrites the at least one of the downlink transmission in the at least one SPS occasion or the uplink transmission in the at least one CG occasion comprises, when the first uplink transmit beam is compatible with the downlink receive beam, simultaneously transmitting the uplink transmission in the at least one CG occasion using the first uplink transmit beam and receiving the PDSCH transmission using the downlink receive beam. In other cases, taking the one or more actions in block 1130 to communicate the transmission that overwrites the at least one of the downlink transmission in the at least one SPS occasion or the uplink transmission in the at least one CG occasion comprises, when the first uplink transmit beam is not compatible with the downlink receive beam receiving the PDSCH transmission using the downlink transmit beam, and not transmitting the uplink transmission in the at least one CG occasion.

In some cases, based on a rule specified in a wireless communications standard, taking the one or more actions to communicate the transmission that overwrites the at least one of the downlink transmission in the at least one SPS occasion or the uplink transmission in the at least one CG occasion comprises one of: simultaneously transmitting the uplink transmission in the at least one CG occasion using the first uplink transmit beam and receiving the PDSCH transmission using the downlink receive beam, or receiving the PDSCH transmission using the downlink receiving beam and not transmitting the uplink transmission in the at least one CG occasion.

In some cases, the second control message includes a bi-directional transmission configuration indicator (TCI) state. In some cases, the bi-directional TCI state indicates: a second uplink transmit beam for transmitting the uplink transmission in the at least one CG occasion and the downlink receive beam for receiving the PDSCH transmission. In such cases, taking the one or more actions in block 1130 to communicate the transmission that overwrites the at least one of the downlink transmission in the at least one SPS occasion or the uplink transmission in the at least one CG occasion comprises: simultaneously transmitting the uplink transmission in the at least one CG occasion using the second uplink transmit beam indicated by the bi-directional TCI state and receiving the PDSCH transmission using the downlink receive beam indicated by the bi-directional TCI state.

In some cases, operations 1100 may further include, based on at least one of beam management measurements or a set of preconfigured candidate downlink and uplink beam pairs, one of: selecting a second uplink transmit beam for transmitting the uplink transmission in the at least one CG occasion that is compatible with the downlink receive beam for receiving the PDSCH transmission or selecting a second downlink receive beam for receiving the PDSCH transmission that is compatible with the first uplink transmit beam for transmitting the uplink transmission in the at least one CG occasion.

In some cases, taking the one or more actions to communicate the transmission that overwrites the at least one of the downlink transmission in the at least one SPS occasion or the uplink transmission in the at least one CG occasion comprises one of: simultaneously transmitting the uplink transmission in the at least one CG occasion using the second uplink transmit beam and receiving the PDSCH transmission using the downlink receive beam or simultaneously transmitting the uplink transmission in the at least one CG occasion using the first uplink transmit beam and receiving the PDSCH transmission using the second downlink receive beam.

Example Wireless Communication Devices

Figure 12:
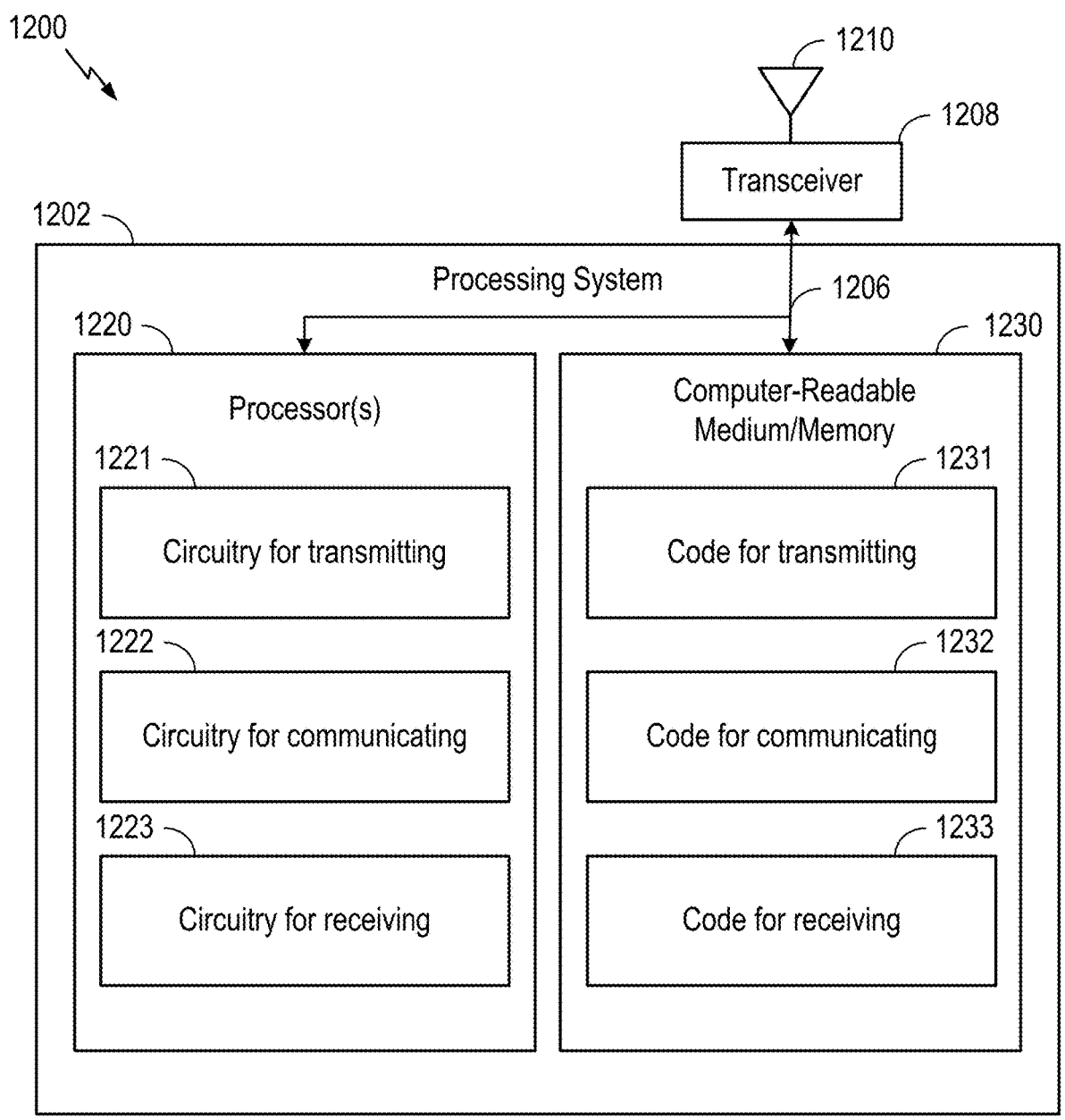
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 9-10. In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 9-10, or other operations for performing the various techniques discussed herein for communicating a dynamically scheduled transmission with a UE that overwrites a transmission in a semi-statically configured scheduling occasion for full duplex.

In the depicted example, computer-readable medium/memory 1230 stores code 1231 for transmitting, code 1232 for communicating, and code 1233 for receiving.

In the depicted example, the one or more processors 1220 include circuitry configured to implement the code stored in the computer-readable medium/memory 1230, including circuitry 1221 for transmitting, circuitry 1222 for communicating, and circuitry 1223 for receiving.

Various components of communications device 1200 may provide means for performing the methods described herein, including with respect to FIGS. 9-10.

In some examples, means for transmitting or sending (or means for outputting for transmission), as well as means for communicating, may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining), as well as means for communicating, may include the transceivers 232 and/or antenna(s) 234 of the base station illustrated in FIG. 2 and/or transceiver 1208 and antenna 1210 of the communication device 1200 in FIG. 12.

Notably, FIG. 12 is an example, and many other examples and configurations of communication device 1200 are possible.

Figure 13:
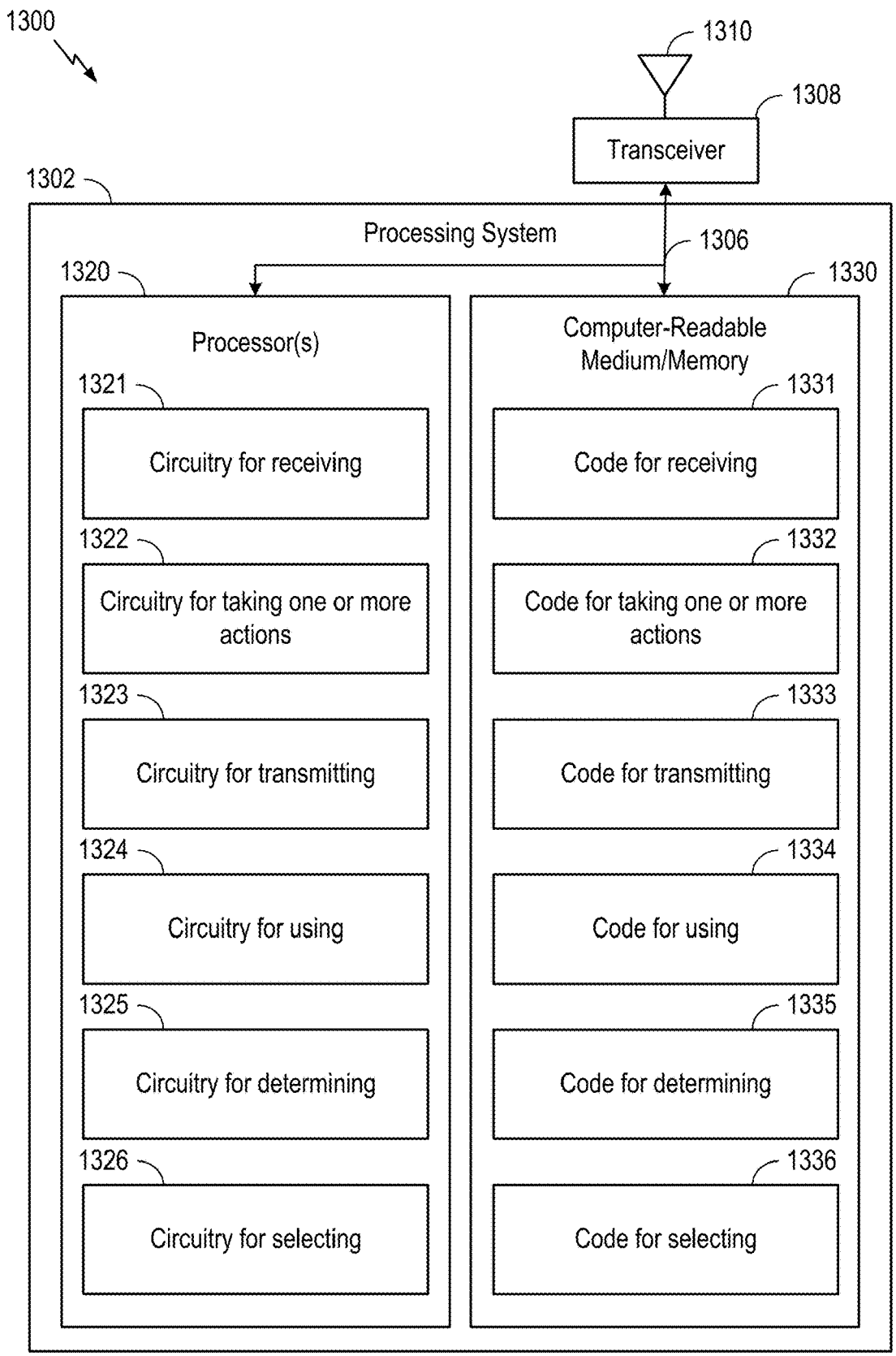
FIG. 13 depicts aspects of an example communications device.

FIG. 13 depicts an example communications device 1300 that includes various components operable, configured, or adapted to perform operations for the techniques disclosed herein, such as the operations depicted and described with respect to FIGS. 9 and 11. In some examples, communication device 1300 may be a user equipment 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 9 and 11, or other operations for performing the various techniques discussed herein for communicating a dynamically scheduled transmission with a BS that overwrites a transmission in a semi-statically configured scheduling occasion for full duplex.

In the depicted example, computer-readable medium/memory 1330 stores code 1331 for receiving, code 1332 for taking one or more actions, code 1333 for transmitting, code 1334 for using, code 1335 for determining, and code 1336 for selecting.

In the depicted example, the one or more processors 1320 include circuitry configured to implement the code stored in the computer-readable medium/memory 1330, including circuitry 1321 for receiving, circuitry 1322 for taking one or more actions, circuitry 1323 for transmitting, circuitry 1324 for using, circuitry 1325 for determining, and circuitry 1326 for selecting.

Various components of communications device 1300 may provide means for performing the methods described herein, including with respect to FIGS. 9 and 11.

In some examples, means for transmitting (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the user equipment 104 illustrated in FIG. 2 and/or transceiver 1308 and antenna 1310 of the communication device 1300 in FIG. 13.

In some examples, means for using, means for determining, and means for selecting, and means for taking one or more actions may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including FD communication component 281).

Notably, FIG. 13 is an example, and many other examples and configurations of communication device 1300 are possible.

Example Clauses

Implementation examples are described in the following numbered clauses:

Clause 1: A method for wireless communication by a user equipment (UE), comprising: receiving a first control message from a base station (BS), activating a first semi-static scheduling configuration and a second semi-static scheduling configuration for full duplex communication, wherein: the first semi-static scheduling configuration comprises at least one semi-persistent scheduling (SPS) occasion in which the UE is scheduled to receive a downlink transmission from the BS, and the second semi-static scheduling configuration comprises at least one configured grant (CG) occasion in which the UE is scheduled to transmit an uplink transmission to the BS, wherein the at least one CG occasion at least partially overlaps in time with the at least one SPS occasion; receiving a second control message comprising a dynamic grant that schedules a transmission associated with the UE that overwrites at least one of the downlink transmission in the at least one SPS occasion or the uplink transmission in the at least one CG occasion; and taking one or more actions, based on the dynamic grant, to communicate, with the BS, at least the transmission that overwrites the at least one of the downlink transmission in the at least one SPS occasion or the uplink transmission in the at least one CG occasion.

Clause 2: The method of Clause 1, wherein the transmission comprises a physical uplink shared channel (PUSCH) transmission and overwrites the uplink transmission in the at least one CG occasion that at least partially overlaps in time with the at least one SPS occasion.

Clause 3: The method of Clause 2, wherein: the first control message indicates a first downlink receive beam for receiving the downlink transmission in the at least one SPS occasion, and the second control message indicates an uplink transmit beam for transmitting the PUSCH transmission.

Clause 4: The method of Clause 3, wherein: the second control message further indicates a second downlink receive beam for receiving the downlink transmission in the at least one SPS occasion that is compatible with the uplink transmit beam for transmitting the PUSCH transmission, and taking the one or more actions to communicate, with the BS, the transmission that overwrites the at least one of the downlink transmission in the at least one SPS occasion or the uplink transmission in the at least one CG occasion comprises: simultaneously receiving the downlink transmission in the at least one SPS occasion using the second downlink receive beam and transmitting the PUSCH transmission using the uplink transmit beam.

Clause 5: The method of Clause 4, wherein: the second control message includes at least one identifier that identifies one or more specific SPS occasions of the at least one SPS occasion to use the second downlink receive beam to receive the downlink transmission, and the method further comprises using the first downlink receive beam to receive other downlink transmissions in SPS occasions of the at least one SPS occasion other than the one or more specific SPS occasions identified by the at least one identifier.

Clause 6: The method of Clause 3, wherein the second control message further includes an indication specifying whether or not to drop reception of the downlink transmission in the at least one SPS occasion.

Clause 7: The method of Clause 6, wherein: the indication specifies to drop the reception of the downlink transmission in the at least one SPS occasion, and taking the one or more actions to communicate, with the BS, the transmission that overwrites the at least one of the downlink transmission in the at least one SPS occasion or the uplink transmission in the at least one CG occasion comprises: transmitting the PUSCH transmission; and not receiving the downlink transmission in the at least one SPS occasion based on the indication specifying to drop the reception of the downlink transmission in the at least one SPS occasion.

Clause 8: The method of Clause 7, wherein: the indication specifying to drop the reception of the downlink transmission in the at least one SPS occasion further indicates one or more specific SPS occasions of the at least one SPS occasion to drop the reception of the downlink transmission, and not receiving the downlink transmission in the at least one SPS occasion comprises not receiving the downlink transmission in the one or more specific SPS occasions.

Clause 9: The method of Clause 3, further comprising determining whether the first downlink receive beam for receiving the downlink transmission in the at least one SPS occasion is compatible with the uplink transmit beam for transmitting the PUSCH transmission based on at least one of beam management measurements or a set of preconfigured candidate downlink and uplink beam pairs.

Clause 10: The method of Clause 9, wherein taking the one or more actions to communicate the transmission that overwrites the at least one of the downlink transmission in the at least one SPS occasion or the uplink transmission in the at least one CG occasion comprises one of: when the first downlink receive beam is compatible with the uplink transmit beam, simultaneously receiving the downlink transmission in the at least one SPS occasion using the first downlink receive beam and transmitting the PUSCH transmission using the uplink transmit beam, or when the first downlink receive beam is not compatible with the uplink transmit beam: transmitting the PUSCH transmission using the uplink transmit beam, and not receiving the downlink transmission in the at least one SPS occasion.

Clause 11: The method of Clause 3, wherein, based on a rule specified in a wireless communications standard, taking the one or more actions to communicate the transmission that overwrites the at least one of the downlink transmission in the at least one SPS occasion or the uplink transmission in the at least one CG occasion comprises one of: simultaneously receiving the downlink transmission in the at least one SPS occasion using the first downlink receive beam and transmitting the PUSCH transmission using the uplink transmit beam, or transmitting the PUSCH transmission using the uplink transmit beam and not receiving the downlink transmission in the at least one SPS occasion.

Clause 12: The method of Clause 3, wherein: the second control message includes a bi-directional transmission configuration indicator (TCI) state, and the bi-directional TCI state indicates: a second downlink receive beam for receiving the downlink transmission in the at least one SPS occasion, and the uplink transmit beam for transmitting the PUSCH transmission.

Clause 13: The method of Clause 12, wherein taking the one or more actions to communicate the transmission that overwrites the at least one of the downlink transmission in the at least one SPS occasion or the uplink transmission in the at least one CG occasion comprises: simultaneously receiving the downlink transmission in the at least one SPS occasion using the second downlink receive beam indicated by the bi-directional TCI state and transmitting the PUSCH transmission using the uplink transmit beam indicated by the bi-directional TCI state.

Clause 14: The method of Clause 3, further comprising, based on at least one of beam management measurements or a set of preconfigured candidate downlink and uplink beam pairs, one of: selecting a second downlink receive beam for receiving the downlink transmission in the at least one SPS occasion that is compatible with the uplink transmit beam for transmitting the PUSCH transmission, or selecting a second uplink transmit beam for transmitting the PUSCH transmission that is compatible with the first downlink receive beam for receiving the downlink transmission in the at least one SPS occasion.

Clause 15: The method of Clause 14, wherein taking the one or more actions to communicate the transmission that overwrites the at least one of the downlink transmission in the at least one SPS occasion or the uplink transmission in the at least one CG occasion comprises one of: simultaneously receiving the downlink transmission in the at least one SPS occasion using the second downlink receive beam and transmitting the PUSCH transmission using the uplink transmit beam, or simultaneously receiving the downlink transmission in the at least one SPS occasion using the first downlink receive beam and transmitting the PUSCH transmission using the second uplink transmit beam.

Clause 16: The method of claim 1, wherein the transmission comprises a physical downlink shared channel (PDSCH) transmission and overwrites the downlink transmission in the at least one SPS occasion.

Clause 17: The method of Clause 16, wherein: the first control message indicates a first uplink transmit beam for transmitting the uplink transmission in the at least one CG occasion, and the second control message indicates a downlink receive beam for receiving the PDSCH transmission.

Clause 18: The method of Clause 17, wherein: the second control message further indicates a second uplink transmit beam for transmitting the uplink transmission in the at least one CG occasion that is compatible with the downlink receive beam for receiving the PDSCH transmission, and taking the one or more actions to communicate, with the BS, the transmission that overwrites the at least one of the downlink transmission in the at least one SPS occasion or the uplink transmission in the at least one CG occasion comprises: simultaneously receiving the PDSCH transmission using the downlink receive beam and transmitting the uplink transmission in the at least one CG occasion using the second uplink transmit beam.

Clause 19: The method of Clause 18, wherein: the second control message includes at least one identifier that identifies one or more specific CG occasions of the at least one CG occasion to use the second uplink transmit beam to transmit the uplink transmission, and the method further comprises using the first uplink transmit beam to transmit other uplink transmissions in CG occasions of the at least one CG occasion other than the one or more specific CG occasions identified by the at least one identifier.

Clause 20: The method of Clause 17, wherein the second control message further includes an indication specifying whether or not to drop transmission of the uplink transmission in the at least one CG occasion.

Clause 21: The method of Clause 20, wherein: the indication specifies to drop the transmission of the uplink transmission in the at least one CG occasion, and taking the one or more actions to communicate, with the BS, the transmission that overwrites the at least one of the downlink transmission in the at least one SPS occasion or the uplink transmission in the at least one CG occasion comprises: receiving the PDSCH transmission; and not transmitting the uplink transmission in the at least one CG occasion based on the indication specifying to drop the transmission of the uplink transmission in the at least one CG occasion.

Clause 22: The method of Clause 21, wherein: the indication specifying to drop the transmission of the uplink transmission in the at least one CG occasion further indicates one or more specific CG occasions of the at least one CG occasion to drop the transmission of the uplink transmission, and not transmitting the uplink transmission in the at least one CG occasion comprises not transmitting the uplink transmission in the one or more specific CG occasions.

Clause 23: The method of Clause 17, further comprising determining whether the first uplink transmit beam for transmitting the uplink transmission in the at least one CG occasion is compatible with the downlink receive beam for receiving the PDSCH transmission based on at least one of beam management measurements or a set of preconfigured candidate downlink and uplink beam pairs.

Clause 24: The method of Clause 23, wherein taking the one or more actions to communicate the transmission that overwrites the at least one of the downlink transmission in the at least one SPS occasion or the uplink transmission in the at least one CG occasion comprises one of: when the first uplink transmit beam is compatible with the downlink receive beam, simultaneously transmitting the uplink transmission in the at least one CG occasion using the first uplink transmit beam and receiving the PDSCH transmission using the downlink receive beam, or when the first uplink transmit beam is not compatible with the downlink receive beam: receiving the PDSCH transmission using the downlink transmit beam, and not transmitting the uplink transmission in the at least one CG occasion.

Clause 25: The method of Clause 17, wherein, based on a rule specified in a wireless communications standard, taking the one or more actions to communicate the transmission that overwrites the at least one of the downlink transmission in the at least one SPS occasion or the uplink transmission in the at least one CG occasion comprises one of: simultaneously transmitting the uplink transmission in the at least one CG occasion using the first uplink transmit beam and receiving the PDSCH transmission using the downlink receive beam, or receiving the PDSCH transmission using the downlink receiving beam and not transmitting the uplink transmission in the at least one CG occasion.

Clause 26: The method of Clause 17, wherein: the second control message includes a bi-directional transmission configuration indicator (TCI) state, and the bi-directional TCI state indicates: a second uplink transmit beam for transmitting the uplink transmission in the at least one CG occasion, and the downlink receive beam for receiving the PDSCH transmission, and taking the one or more actions to communicate the transmission that overwrites the at least one of the downlink transmission in the at least one SPS occasion or the uplink transmission in the at least one CG occasion comprises: simultaneously transmitting the uplink transmission in the at least one CG occasion using the second uplink transmit beam indicated by the bi-directional TCI state and receiving the PDSCH transmission using the downlink receive beam indicated by the bi-directional TCI state.

Clause 27: The method of Clause 17, further comprising, based on at least one of beam management measurements or a set of preconfigured candidate downlink and uplink beam pairs, one of: selecting a second uplink transmit beam for transmitting the uplink transmission in the at least one CG occasion that is compatible with the downlink receive beam for receiving the PDSCH transmission, or selecting a second downlink receive beam for receiving the PDSCH transmission that is compatible with the first uplink transmit beam for transmitting the uplink transmission in the at least one CG occasion.

Clause 28: The method of Clause 27, wherein taking the one or more actions to communicate the transmission that overwrites the at least one of the downlink transmission in the at least one SPS occasion or the uplink transmission in the at least one CG occasion comprises one of: simultaneously transmitting the uplink transmission in the at least one CG occasion using the second uplink transmit beam and receiving the PDSCH transmission using the downlink receive beam, or simultaneously transmitting the uplink transmission in the at least one CG occasion using the first uplink transmit beam and receiving the PDSCH transmission using the second downlink receive beam.

Clause 29: A method for wireless communication by a base station (BS), comprising: transmitting a first control message to a user equipment (UE), activating a first semi-static scheduling configuration and a second semi-static scheduling configuration for full duplex communication, wherein: the first semi-static scheduling configuration comprises at least one semi-persistent scheduling (SPS) occasion in which the UE is scheduled to receive a downlink transmission from the BS, and the second semi-static scheduling configuration comprises at least one configured grant (CG) occasion in which the UE is scheduled to transmit an uplink transmission to the BS, wherein the at least one CG occasion at least partially overlaps in time with the at least one SPS occasion; transmitting a second control message comprising a dynamic grant that schedules a transmission associated with the UE that overwrites at least one of the downlink transmission in the at least one SPS occasion or the uplink transmission in the at least one CG occasion; and communicating, based on the dynamic grant, at least the transmission that overwrites the at least one of the downlink transmission in the at least one SPS occasion or the uplink transmission in the at least one CG occasion with the UE.

Clause 30: The method of Clause 29, wherein the transmission comprises a physical uplink shared channel (PUSCH) transmission and overwrites the uplink transmission in the at least one CG occasion that at least partially overlaps in time with the at least one SPS occasion.

Clause 31: The method of Clause 29, wherein: the first control message indicates a first downlink receive beam for receiving the downlink transmission in the at least one SPS occasion, and the second control message indicates an uplink transmit beam for transmitting the PUSCH transmission.

Clause 32: The method of Clause 31, wherein: the second control message further indicates a second downlink receive beam for receiving the downlink transmission in the at least one SPS occasion that is compatible with the uplink transmit beam for transmitting the PUSCH transmission, and communicating at least the transmission that overwrites the at least one of the downlink transmission in the at least one SPS occasion or the uplink transmission in the at least one CG occasion with the UE comprises: simultaneously transmitting the downlink transmission in the at least one SPS occasion and receiving the PUSCH transmission.

Clause 33: The method of Clause 32, wherein: the second control message includes at least one identifier that identifies one or more specific SPS occasions of the at least one SPS occasion to use the second downlink receive beam to receive the downlink transmission.

Clause 34: The method of Clause 31, wherein the second control message further includes an indication specifying whether or not to drop reception of the downlink transmission in the at least one SPS occasion.

Clause 35: The method of Clause 34, wherein: the indication specifies to drop the reception of the downlink transmission in the at least one SPS occasion, and communicating at least the transmission that overwrites the at least one of the downlink transmission in the at least one SPS occasion or the uplink transmission in the at least one CG occasion with the UE comprises: receiving the PUSCH transmission; and not transmitting the downlink transmission in the at least one SPS occasion based on the indication specifying to drop the reception of the downlink transmission in the at least one SPS occasion.

Clause 36: The method of Clause 35, wherein: the indication specifying to drop the reception of the downlink transmission in the at least one SPS occasion further indicates one or more specific SPS occasions of the at least one SPS occasion to drop the reception of the downlink transmission, and not transmitting the downlink transmission in the at least one SPS occasion comprises not transmitting the downlink transmission in the one or more specific SPS occasions.

Clause 37: The method of Clause 31, wherein, based on a rule specified in a wireless communications standard, communicating at least the transmission that overwrites the at least one of the downlink transmission in the at least one SPS occasion or the uplink transmission in the at least one CG occasion with the UE comprises one of: simultaneously transmitting the downlink transmission in the at least one CG occasion and receiving the PUSCH transmission, or receiving the PUSCH transmission and not transmitting the downlink transmission in the at least one SPS occasion.

Clause 38: The method of Clause 31, wherein: the second control message includes a bi-directional transmission configuration indicator (TCI) state, the bi-directional TCI state indicates: a second downlink receive beam for receiving the downlink transmission in the at least one SPS occasion, and the uplink transmit beam for transmitting the PUSCH transmission.

Clause 39: The method of Clause 38, wherein communicating at least the transmission that overwrites the at least one of the downlink transmission in the at least one SPS occasion or the uplink transmission in the at least one CG occasion with the UE comprises: based on the bi-directional TCI state, simultaneously transmitting the downlink transmission in the at least one SPS occasion and receiving the PUSCH transmission.

Clause 40: The method of Clause 29, wherein the transmission comprises a physical downlink shared channel (PDSCH) transmission and overwrites the downlink transmission in the at least one SPS occasion.

Clause 41: The method of Clause 40, wherein: the first control message indicates a first uplink transmit beam for transmitting the uplink transmission in the at least one CG occasion, and the second control message indicates a downlink receive beam for receiving the PDSCH transmission.

Clause 42: The method of Clause 41, wherein: the second control message further indicates a second uplink transmit beam for transmitting the uplink transmission in the at least one CG occasion that is compatible with the downlink receive beam for receiving the PDSCH transmission, and communicating at least the transmission that overwrites the at least one of the downlink transmission in the at least one SPS occasion or the uplink transmission in the at least one CG occasion with the UE comprises: simultaneously transmitting the PDSCH transmission and receiving the uplink transmission in the at least one CG occasion.

Clause 43: The method of claim 42, wherein: the second control message includes at least one identifier that identifies one or more specific CG occasions of the at least one CG occasion to use the second uplink transmit beam to transmit the uplink transmission.

Clause 44: The method of Clause 41, wherein the second control message further includes an indication specifying whether or not to drop transmission of the uplink transmission in the at least one CG occasion.

Clause 45: The method of Clause 44, wherein: the indication specifies to drop the transmission of the uplink transmission in the at least one CG occasion, and communicating at least the transmission that overwrites the at least one of the downlink transmission in the at least one SPS occasion or the uplink transmission in the at least one CG occasion with the UE comprises: transmitting the PDSCH transmission; and not receiving the uplink transmission in the at least one CG occasion based on the indication specifying to drop the transmission of the uplink transmission in the at least one CG occasion.

Clause 46: The method of Clause 45, wherein: the indication specifying to drop the transmission of the uplink transmission in the at least one CG occasion further indicates one or more specific CG occasions of the at least one CG occasion to drop the transmission of the uplink transmission, and not receiving the uplink transmission in the at least one CG occasion comprises not receiving the uplink transmission in the one or more specific CG occasions.

Clause 47: The method of Clause 41, wherein, based on a rule specified in a wireless communications standard, communicating at least the transmission that overwrites the at least one of the downlink transmission in the at least one SPS occasion or the uplink transmission in the at least one CG occasion with the UE comprises one of: simultaneously receiving the uplink transmission in the at least one CG occasion and transmitting the PDSCH transmission, or transmitting the PDSCH transmission and not receiving the uplink transmission in the at least one CG occasion.

Clause 48: The method of claim 41, wherein: the second control message includes a bi-directional transmission configuration indicator (TCI) state, the bi-directional TCI state indicates: a second uplink transmit beam for transmitting the uplink transmission in the at least one CG occasion, and the downlink receive beam for receiving the PDSCH transmission, and communicating at least the transmission that overwrites the at least one of the downlink transmission in the at least one SPS occasion or the uplink transmission in the at least one CG occasion with the UE comprises: based on the bi-directional TCI state, simultaneously receiving the uplink transmission in the at least one CG occasion and transmitting the PDSCH transmission.

Clause 49: An apparatus, comprising: a memory comprising executable instructions; one or more processors configured to execute the executable instructions and cause the apparatus to perform a method in accordance with any one of Clauses 1-48.

Clause 50: An apparatus, comprising means for performing a method in accordance with any one of Clauses 1-48.

Clause 51: A non-transitory computer-readable medium comprising executable instructions that, when executed by one or more processors of an apparatus, cause the apparatus to perform a method in accordance with any one of Clauses 1-48.

Clause 52: A computer program product embodied on a computer-readable storage medium comprising code for performing a method in accordance with any one of Clauses 1-48.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating a dynamically scheduled transmission with a UE that overwrites a transmission in a semi-statically configured scheduling occasion for full duplex in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
receiving a first control message from a base station (BS), activating a first semi-static scheduling configuration and a second semi-static scheduling configuration for full duplex communication, wherein:
the first semi-static scheduling configuration comprises at least one semi-persistent scheduling (SPS) occasion in which the UE is scheduled to receive a downlink transmission from the BS, and
the second semi-static scheduling configuration comprises at least one configured grant (CG) occasion in which the UE is scheduled to transmit an uplink transmission to the BS, wherein the at least one CG occasion at least partially overlaps in time with the at least one SPS occasion;
receiving a second control message comprising a dynamic grant that schedules a transmission associated with the UE that overwrites at least one of the downlink transmission in the at least one SPS occasion or the uplink transmission in the at least one CG occasion, wherein:
the first control message indicates a first downlink receive beam for receiving the downlink transmission in the at least one SPS occasion and the second control message indicates an uplink transmit beam for transmitting the transmission scheduled by the dynamic grant; or
the first control message indicates a first uplink transmit beam for transmitting the uplink transmission in the at least one CG occasion and the second control message indicates a downlink receive beam for receiving the transmission scheduled by the dynamic grant; and
taking one or more actions, based on the dynamic grant, to communicate, with the BS, at least the transmission that overwrites the at least one of the downlink transmission in the at least one SPS occasion or the uplink transmission in the at least one CG occasion.

2. The method of claim 1, wherein:
the first control message indicates the first downlink receive beam for receiving the downlink transmission in the at least one SPS occasion, and
the second control message indicates the uplink transmit beam for transmitting the transmission scheduled by the dynamic grant.

3. The method of claim 2, wherein the transmission comprises a physical uplink shared channel (PUSCH) transmission and overwrites the uplink transmission in the at least one CG occasion that at least partially overlaps in time with the at least one SPS occasion.

4. The method of claim 3, wherein:
the second control message further indicates a second downlink receive beam for receiving the downlink transmission in the at least one SPS occasion that is compatible with the uplink transmit beam for transmitting the PUSCH transmission, and
taking the one or more actions to communicate, with the BS, the transmission that overwrites the at least one of the downlink transmission in the at least one SPS occasion or the uplink transmission in the at least one CG occasion comprises:
simultaneously receiving the downlink transmission in the at least one SPS occasion using the second downlink receive beam and transmitting the PUSCH transmission using the uplink transmit beam.

5. The method of claim 4, wherein:
the second control message includes at least one identifier that identifies one or more specific SPS occasions of the at least one SPS occasion to use the second downlink receive beam to receive the downlink transmission, and
the method further comprises using the first downlink receive beam to receive other downlink transmissions in SPS occasions of the at least one SPS occasion other than the one or more specific SPS occasions identified by the at least one identifier.

6. The method of claim 3, wherein the second control message further includes an indication specifying whether or not to drop reception of the downlink transmission in the at least one SPS occasion.

7. The method of claim 6, wherein:
the indication specifies to drop the reception of the downlink transmission in the at least one SPS occasion, and
taking the one or more actions to communicate, with the BS, the transmission that overwrites the at least one of the downlink transmission in the at least one SPS occasion or the uplink transmission in the at least one CG occasion comprises:
transmitting the PUSCH transmission; and
not receiving the downlink transmission in the at least one SPS occasion based on the indication specifying to drop the reception of the downlink transmission in the at least one SPS occasion.

8. The method of claim 7, wherein:
the indication specifying to drop the reception of the downlink transmission in the at least one SPS occasion further indicates one or more specific SPS occasions of the at least one SPS occasion to drop the reception of the downlink transmission, and
not receiving the downlink transmission in the at least one SPS occasion comprises not receiving the downlink transmission in the specific SPS occasion.

9. The method of claim 3, further comprising determining whether the first downlink receive beam for receiving the downlink transmission in the at least one SPS occasion is compatible with the uplink transmit beam for transmitting the PUSCH transmission based on at least one of beam management measurements or a set of preconfigured candidate downlink and uplink beam pairs.

10. The method of claim 9, wherein taking the one or more actions to communicate the transmission that overwrites the at least one of the downlink transmission in the at least one SPS occasion or the uplink transmission in the at least one CG occasion comprises one of:
when the first downlink receive beam is compatible with the uplink transmit beam, simultaneously receiving the downlink transmission in the at least one SPS occasion using the first downlink receive beam and transmitting the PUSCH transmission using the uplink transmit beam, or
when the first downlink receive beam is not compatible with the uplink transmit beam:
transmitting the PUSCH transmission using the uplink transmit beam, and
not receiving the downlink transmission in the at least one SPS occasion.

11. The method of claim 3, wherein, based on a rule specified in a wireless communications standard, taking the one or more actions to communicate the transmission that overwrites the at least one of the downlink transmission in the at least one SPS occasion or the uplink transmission in the at least one CG occasion comprises one of:
simultaneously receiving the downlink transmission in the at least one SPS occasion using the first downlink receive beam and transmitting the PUSCH transmission using the uplink transmit beam, or
transmitting the PUSCH transmission using the uplink transmit beam and not receiving the downlink transmission in the at least one SPS occasion.

12. The method of claim 2, wherein:
the second control message includes a bi-directional transmission configuration indicator (TCI) state, and
the bi-directional TCI state indicates:
a second downlink receive beam for receiving the downlink transmission in the at least one SPS occasion, and
the uplink transmit beam for transmitting the PUSCH transmission.

13. The method of claim 12, wherein taking the one or more actions to communicate the transmission that overwrites the at least one of the downlink transmission in the at least one SPS occasion or the uplink transmission in the at least one CG occasion comprises:
simultaneously receiving the downlink transmission in the at least one SPS occasion using the second downlink receive beam indicated by the bi-directional TCI state and transmitting the PUSCH transmission using the uplink transmit beam indicated by the bi-directional TCI state.

14. The method of claim 2, further comprising, based on at least one of beam management measurements or a set of preconfigured candidate downlink and uplink beam pairs, one of:
selecting a second downlink receive beam for receiving the downlink transmission in the at least one SPS occasion that is compatible with the uplink transmit beam for transmitting the PUSCH transmission, or
selecting a second uplink transmit beam for transmitting the PUSCH transmission that is compatible with the first downlink receive beam for receiving the downlink transmission in the at least one SPS occasion.

15. The method of claim 14, wherein taking the one or more actions to communicate the transmission that overwrites the at least one of the downlink transmission in the at least one SPS occasion or the uplink transmission in the at least one CG occasion comprises one of:
simultaneously receiving the downlink transmission in the at least one SPS occasion using the second downlink receive beam and transmitting the PUSCH transmission using the uplink transmit beam, or
simultaneously receiving the downlink transmission in the at least one SPS occasion using the first downlink receive beam and transmitting the PUSCH transmission using the second uplink transmit beam.

16. The method of claim 1, wherein:
the first control message indicates a first uplink transmit beam for transmitting the uplink transmission in the at least one CG occasion, and
the second control message indicates a downlink receive beam for receiving the transmission scheduled by the dynamic grant.

17. The method of claim 16, wherein the transmission comprises a physical downlink shared channel (PDSCH) transmission and overwrites the downlink transmission in the at least one SPS occasion.

18. The method of claim 16, wherein:

the second control message further indicates a second uplink transmit beam for transmitting the uplink transmission in the at least one CG occasion that is compatible with the downlink receive beam for receiving the PDSCH transmission, and taking the one or more actions to communicate, with the BS, the transmission that overwrites the at least one of the downlink transmission in the at least one SPS occasion or the uplink transmission in the at least one CG occasion comprises:

simultaneously receiving the PDSCH transmission using the downlink receive beam and transmitting the uplink transmission in the at least one CG occasion using the second uplink transmit beam.

19. The method of claim 18, wherein:
the second control message includes at least one identifier that identifies one or more specific CG occasions of the at least one CG occasion to use the second uplink transmit beam to transmit the uplink transmission, and
the method further comprises using the first uplink transmit beam to transmit other uplink transmissions in CG occasions of the at least one CG occasion other than the one or more specific CG occasions identified by the at least one identifier.

20. The method of claim 16, wherein the second control message further includes an indication specifying whether or not to drop transmission of the uplink transmission in the at least one CG occasion.

21. The method of claim 20, wherein:
the indication specifies to drop the transmission of the uplink transmission in the at least one CG occasion, and
taking the one or more actions to communicate, with the BS, the transmission that overwrites the at least one of the downlink transmission in the at least one SPS occasion or the uplink transmission in the at least one CG occasion comprises:
receiving the PDSCH transmission; and
not transmitting the uplink transmission in the at least one CG occasion based on the indication specifying to drop the transmission of the uplink transmission in the at least one CG occasion.

22. The method of claim 21, wherein:
the indication specifying to drop the transmission of the uplink transmission in the at least one CG occasion further indicates one or more specific CG occasions of the at least one CG occasion to drop the transmission of the uplink transmission, and
not transmitting the uplink transmission in the at least one CG occasion comprises not transmitting the uplink transmission in the one or more specific CG occasions.

23. The method of claim 16, further comprising determining whether the first uplink transmit beam for transmitting the uplink transmission in the at least one CG occasion is compatible with the downlink receive beam for receiving the PDSCH transmission based on at least one of beam management measurements or a set of preconfigured candidate downlink and uplink beam pairs.

24. The method of claim 23, wherein taking the one or more actions to communicate the transmission that overwrites the at least one of the downlink transmission in the at least one SPS occasion or the uplink transmission in the at least one CG occasion comprises one of:

when the first uplink transmit beam is compatible with the downlink receive beam, simultaneously transmitting the uplink transmission in the at least one CG occasion using the first uplink transmit beam and receiving the PDSCH transmission using the downlink receive beam, or when the first uplink transmit beam is not compatible with the downlink receive beam:
receiving the PDSCH transmission using the downlink transmit beam, and
not transmitting the uplink transmission in the at least one CG occasion.

25. The method of claim 16, wherein, based on a rule specified in a wireless communications standard, taking the one or more actions to communicate the transmission that overwrites the at least one of the downlink transmission in the at least one SPS occasion or the uplink transmission in the at least one CG occasion comprises one of:
simultaneously transmitting the uplink transmission in the at least one CG occasion using the first uplink transmit beam and receiving the PDSCH transmission using the downlink receive beam, or
receiving the PDSCH transmission using the downlink receiving beam and not transmitting the uplink transmission in the at least one CG occasion.

26. The method of claim 16, wherein:
the second control message includes a bi-directional transmission configuration indicator (TCI) state, and
the bi-directional TCI state indicates:
a second uplink transmit beam for transmitting the uplink transmission in the at least one CG occasion, and
the downlink receive beam for receiving the PDSCH transmission, and
taking the one or more actions to communicate the transmission that overwrites the at least one of the downlink transmission in the at least one SPS occasion or the uplink transmission in the at least one CG occasion comprises:
simultaneously transmitting the uplink transmission in the at least one CG occasion using the second uplink transmit beam indicated by the bi-directional TCI state and receiving the PDSCH transmission using the downlink receive beam indicated by the bi-directional TCI state.

27. The method of claim 16, further comprising, based on at least one of beam management measurements or a set of preconfigured candidate downlink and uplink beam pairs, one of:
selecting a second uplink transmit beam for transmitting the uplink transmission in the at least one CG occasion that is compatible with the downlink receive beam for receiving the PDSCH transmission, or
selecting a second downlink receive beam for receiving the PDSCH transmission that is compatible with the first uplink transmit beam for transmitting the uplink transmission in the at least one CG occasion, wherein taking the one or more actions to communicate the transmission that overwrites the at least one of the downlink transmission in the at least one SPS occasion or the uplink transmission in the at least one CG occasion comprises one of:
simultaneously transmitting the uplink transmission in the at least one CG occasion using the second uplink transmit beam and receiving the PDSCH transmission using the downlink receive beam, or
simultaneously transmitting the uplink transmission in the at least one CG occasion using the first uplink transmit beam and receiving the PDSCH transmission using the second downlink receive beam.

28. An apparatus for wireless communication, comprising:
one or more memories comprising executable instructions; and
one or more processors configured to execute the executable instructions and cause the apparatus to:
receive a first control message from a base station (BS), activating a first semi-static scheduling configuration and a second semi-static scheduling configuration for full duplex communication, wherein:
the first semi-static scheduling configuration comprises at least one semi-persistent scheduling (SPS) occasion in which the apparatus is scheduled to receive a downlink transmission from the BS, and
the second semi-static scheduling configuration comprises at least one configured grant (CG) occasion in which the apparatus is scheduled to transmit an uplink transmission to the B S, wherein the at least one CG occasion at least partially overlaps in time with the at least one SPS occasion;
receive a second control message comprising a dynamic grant that schedules a transmission associated with the apparatus that overwrites at least one of the downlink transmission in the at least one SPS occasion or the uplink transmission in the at least one CG occasion, wherein:
the first control message indicates a first downlink receive beam for receiving the downlink transmission in the at least one SPS occasion and the second control message indicates an uplink transmit beam for transmitting the transmission scheduled by the dynamic grant; or
the first control message indicates a first uplink transmit beam for transmitting the uplink transmission in the at least one CG occasion and the second control message indicates a downlink receive beam for receiving the transmission scheduled by the dynamic grant; and
take one or more actions, based on the dynamic grant, to communicate, with the BS, at least the transmission that overwrites the at least one of the downlink transmission in the at least one SPS occasion or the uplink transmission in the at least one CG occasion.

29. An apparatus for wireless communication, comprising:
means for receiving a first control message from a base station (B S), activating a first semi-static scheduling configuration and a second semi-static scheduling configuration for full duplex communication, wherein:
the first semi-static scheduling configuration comprises at least one semi-persistent scheduling (SPS) occasion in which the apparatus is scheduled to receive a downlink transmission from the BS, and
the second semi-static scheduling configuration comprises at least one configured grant (CG) occasion in which the apparatus is scheduled to transmit an uplink transmission to the BS, wherein the at least one CG occasion at least partially overlaps in time with the at least one SPS occasion;
means for receiving a second control message comprising a dynamic grant that schedules a transmission associated with the apparatus that overwrites at least one of the downlink transmission in the at least one SPS occasion or the uplink transmission in the at least one CG occasion, wherein:
the first control message indicates a first downlink receive beam for receiving the downlink transmission in the at least one SPS occasion and the second control message indicates an uplink transmit beam for transmitting the transmission scheduled by the dynamic grant; or
the first control message indicates a first uplink transmit beam for transmitting the uplink transmission in the at least one CG occasion and the second control message indicates a downlink receive beam for receiving the transmission scheduled by the dynamic grant; and
means for taking one or more actions, based on the dynamic grant, to communicate, with the BS, at least the transmission that overwrites the at least one of the downlink transmission in the at least one SPS occasion or the uplink transmission in the at least one CG occasion.

30. A non-transitory computer-readable medium for wireless communication, comprising:
executable instructions that, when executed by one or more processors of an apparatus, cause the apparatus to:
receive a first control message from a base station (BS), activating a first semi-static scheduling configuration and a second semi-static scheduling configuration for full duplex communication, wherein:
the first semi-static scheduling configuration comprises at least one semi-persistent scheduling (SPS) occasion in which the apparatus is scheduled to receive a downlink transmission from the BS, and
the second semi-static scheduling configuration comprises at least one configured grant (CG) occasion in which the apparatus is scheduled to transmit an uplink transmission to the B S, wherein the at least one CG occasion at least partially overlaps in time with the at least one SPS occasion;
receive a second control message comprising a dynamic grant that schedules a transmission associated with the apparatus that overwrites at least one of the downlink transmission in the at least one SPS occasion or the uplink transmission in the at least one CG occasion, wherein:
the first control message indicates a first downlink receive beam for receiving the downlink transmission in the at least one SPS occasion and the second control message indicates an uplink transmit beam for transmitting the transmission scheduled by the dynamic grant; or
the first control message indicates a first uplink transmit beam for transmitting the uplink transmission in the at least one CG occasion and the second control message indicates a downlink receive beam for receiving the transmission scheduled by the dynamic grant; and
take one or more actions, based on the dynamic grant, to communicate, with the BS, at least the transmission that overwrites the at least one of the downlink transmission in the at least one SPS occasion or the uplink transmission in the at least one CG occasion.

* * * * *